US008328903B2

(12) United States Patent
Parham et al.

(10) Patent No.: US 8,328,903 B2
(45) Date of Patent: Dec. 11, 2012

(54) DETERMINING EFFLUENT CONCENTRATION PROFILES AND SERVICE LIVES OF AIR PURIFYING RESPIRATOR CARTRIDGES

(75) Inventors: Michael Parham, Matthews, NC (US); Amy Staubs, Matthews, NC (US); Yuqing Ding, Charlotte, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 1114 days.

(21) Appl. No.: 12/177,358

(22) Filed: Jul. 22, 2008

(65) Prior Publication Data

US 2009/0298192 A1 Dec. 3, 2009

Related U.S. Application Data

(60) Provisional application No. 61/057,522, filed on May 30, 2008.

(51) Int. Cl.
*B01D 46/46* (2006.01)

(52) U.S. Cl. .......................................... 95/8

(58) Field of Classification Search .................. 95/8
See application file for complete search history.

(56) References Cited

U.S. PATENT DOCUMENTS 3,966,440 A 6/1976 Roberts
4,146,887 A 3/1979 Magnante
4,154,586 A 5/1979 Jones et al.
4,155,358 A 5/1979 McAllister et al.
4,326,514 A 4/1982 Eian
4,421,719 A 12/1983 Burleigh
4,530,706 A 7/1985 Jones
4,684,380 A 8/1987 Leichnitz
4,796,467 A 1/1989 Burt et al.
4,847,594 A 7/1989 Stetter
5,376,554 A 12/1994 V-Dinh
5,512,882 A 4/1996 Stetter et al.
5,659,296 A 8/1997 Debe et al.
5,666,949 A 9/1997 Debe et al.
5,861,053 A 1/1999 Noritake et al.

(Continued)

FOREIGN PATENT DOCUMENTS

JP H-09196830 7/1997

(Continued)

OTHER PUBLICATIONS

Gerry O. Wood; "Estimating Service Lives of Organic Vapor Cartridges II: A Single Vapor at All Humidities"; Journal Occupational and Environmental Hygiene, Jul. 1, 2004; 22 pgs.

(Continued)

*Primary Examiner* — Robert A Hopkins
(74) *Attorney, Agent, or Firm* — Charles H. Livingston; The Small Patent Law Group LLC

(57) ABSTRACT

A method for determining at least one of an effluent concentration profile, a breakthrough time and a filter cartridge recommendation includes receiving at least one input parameter, determining at least one of the effluent concentration profile, the breakthrough time and the filter cartridge recommendation based on the input parameter, and graphically displaying at least one of the effluent concentration profile, the breakthrough time, and the filter cartridge recommendation. The effluent concentration profile includes a plot of a concentration of a chemical species over a period of time. The breakthrough time includes a time at which a predetermined concentration of the chemical species passes through a filter cartridge.

27 Claims, 6 Drawing Sheets

U.S. PATENT DOCUMENTS

| | | | |
|---|---|---|---|
| 5,879,629 A * | 3/1999 | Capuano et al. | 422/82 |
| 5,976,881 A | 11/1999 | Klingner | |
| 6,014,889 A | 1/2000 | Castor | |
| 6,040,777 A | 3/2000 | Ammann et al. | |
| 6,186,140 B1 | 2/2001 | Hoague | |
| 6,375,725 B1 | 4/2002 | Bernard et al. | |
| 6,497,756 B1 | 12/2002 | Curado et al. | |
| 6,701,864 B2 | 3/2004 | Watson, Jr. et al. | |
| 6,812,035 B1 | 11/2004 | Spitler et al. | |

FOREIGN PATENT DOCUMENTS

| | | |
|---|---|---|
| JP | 2002-282848 | 2/2002 |

OTHER PUBLICATIONS

Gerry O. Wood et al; "Estimating-Service Lives of Organic Vapor Cartridges III: Multiple Vapors at All Humidities"; Journal of Occupational and Environmental Hygiene, Mar. 26, 2007; 13 pgs.

Gerry O. Wood; "A Model for Absorption Capacities of Charcoal Beds I. Relative Humidity Effects"; American Hygiene Association Journal (48), Jul. 1987, 4 pgs.

Gerry O. Wood; "A Model for Absorption Capacities of Charcoal Beds II. Challenge Concentration Effects"; American Hygiene Association Journal (48)8, 703-709 (1987).

Gerry O. Wood; "Organic Vapor Respirator Cartridge Breakthrough Curve Analysis"; Journal of the International Society for Respiratory Protection; Winter 1992-1993; 13 pgs.

Gerry O. Wood; "Estimating Service Lives of Organic Vapor Cartridges"; American Industrial Hygiene Association Journal (55) Jan. 1994; 5 pgs.

Gerry O. Wood; "A Review and Comparison of Adsorption isotherm Equations Used to Correlate and Predict Organic Vapor Cartridge Capacities"; American Industrial Hygiene Association Journal (52) Jun. 1991; 8 pgs.

Gerry O. Wood; "Review of the Wheeler Equation and Comparison of its Applications to Organic Vapor Respirator Cartridge Breakthrough Data"; American Industrial Hygiene Association Journal (50)8: 400-407 (1989).

Gerry O. Wood; "Quantification and application of skew of breakthrough curves for gases and vapors eluting from activated carbon beds"; Carbon 40 (2002) 1883-1890.

Gerry O. Wood; "Affinity coefficients of the Polanyi /Dubinin adsorption isotherm equations A review with compilations and correlations"; Carbon 39 (2001)343-356.

J.J. Mahle; "A Henry's law limit for the DR and DA equations"; U.S. Army, Edgewood Research Development and Engineering Center; Aberdeen Proving Ground, MD Oct. 1996; 4 pgs.

Gerry O. Wood; "Estimating Service Lives of Air-Purifying Respirator Cartridges for Reactive Gas Removal"; Journal of Occupational and Environmental Hygiene; Aug. 2005; 10 pages.

Yoon, et al; "*Breakthrough Time and Adsorption Capacity of Respirator Cartridges*"; American Industrial Hygiene Association, vol. 53:303-316; May 1992, 15 pgs.

Jonas, L.A., et al; "*Predictive Equations in Gas Adsorption Kinetics*"; Carbon, vol. 11: 59-64, 1973, 6 pgs.

* cited by examiner

DETERMINING EFFLUENT CONCENTRATION PROFILES AND SERVICE LIVES OF AIR PURIFYING RESPIRATOR CARTRIDGES

CROSS-REFERENCE TO RELATED APPLICATIONS

This application claims priority benefit to co-pending U.S. Provisional Patent Application Ser. No. 61/057,522 (the "'522 Application"). The '522 Application was filed on May 30, 2008, and is entitled "Determining Effluent Concentration Profiles and Service Lives of Air Purifying Respirator Cartridges." The entire disclosure of the '522 Application is incorporated by reference herein in its entirety.

BACKGROUND OF THE INVENTION

This invention relates generally to systems and methods for determining the service life of air filters, and more particularly, for a system and method for calculating the service life of cartridges for air purifying respirators.

Determination of the service life of filter cartridges or filter beds in the filter cartridges of air purifying respirators is a regulatory requirement in the United States. Moreover, many users of air purifying respirators desire to have change out data and/or an estimated service life calculation. Change out data may include, for example, a schedule for when the cartridges in air purifying respirators should be changed out, or replaced, with new cartridges. The estimated service life calculation may include a determination of how long the cartridges in an air purifying respirator should last. Both the change out data and the estimated service life calculation may be based in whole or part on the input of the conditions in which the cartridges and respirators are used.

Known methods and systems used to determine change out data and service life calculations for air purifying respirator cartridges have several shortcomings. For example, known systems and methods do not provide a graphical output of an effluent concentration profile, a breakthrough time or a service life of a filter cartridge. Also, these systems and methods do not provide for dynamic calculation of an effluent concentration profile, a breakthrough time or a service life based on dynamically changing inputs from a user. Moreover, to the extent these systems and methods do determine a breakthrough time or service life, the mathematical models upon which the breakthrough time or service life is based do not accurately determine the breakthrough time or service life for many contaminants, including many contaminants having relatively low molecular weights and/or low boiling points.

Thus, a need exists for a system and method for determining change out data and service life calculations for air purifying respirator cartridges that provide a graphical output of effluent concentration profiles, allow for dynamic calculations of service life calculations and are based on more accurate models

BRIEF DESCRIPTION OF THE INVENTION

In one embodiment, a method for determining at least one of an effluent concentration profile, a breakthrough time and a filter cartridge recommendation includes receiving at least one input parameter, determining at least one of the effluent concentration profile, the breakthrough time and the filter cartridge recommendation based on the input parameter, and graphically displaying at least one of the effluent concentration profile, the breakthrough time, and the filter cartridge recommendation. The effluent concentration profile includes a plot of a concentration of a chemical species over a period of time. The breakthrough time includes a time at which a predetermined concentration of the chemical species passes through a filter cartridge.

In another embodiment, a computer-readable storage medium including one or more sets of instructions for determining at least one of an effluent concentration profile, a breakthrough time and a filter cartridge recommendation, the sets of instructions includes instructions for receiving at least one input parameter, instructions for determining at least one of the effluent concentration profile, the breakthrough time and the filter cartridge recommendation based on the input parameters, and instructions for graphically displaying at least one of the effluent concentration profile, the breakthrough time, and the filter cartridge recommendation. The effluent concentration profile includes a plot of a concentration of a chemical species over a period of time. The breakthrough time includes a time at which a predetermined concentration of the chemical species passes through a filter cartridge.

In another embodiment, a system for determining at least one of an effluent concentration profile, a breakthrough time and a filter cartridge recommendation includes a user interface, a processor module and an output device. The user interface is configured to input at least, one input parameter. The processor module is communicatively coupled to the user interface and receives the input parameter. The processor module determines at least one of the effluent concentration profile, the breakthrough time and the filter cartridge recommendation based on the input parameter. The output device is communicatively coupled to the processor module and graphically displays at least one of the effluent concentration profile, the breakthrough time, and the filter cartridge recommendation. The effluent concentration profile includes a plot of a concentration of a chemical species over a period of time. The breakthrough time includes a time at which a predetermined concentration of the chemical species passes through a filter cartridge.

DETAILED DESCRIPTION OF THE INVENTION

Figure 1:
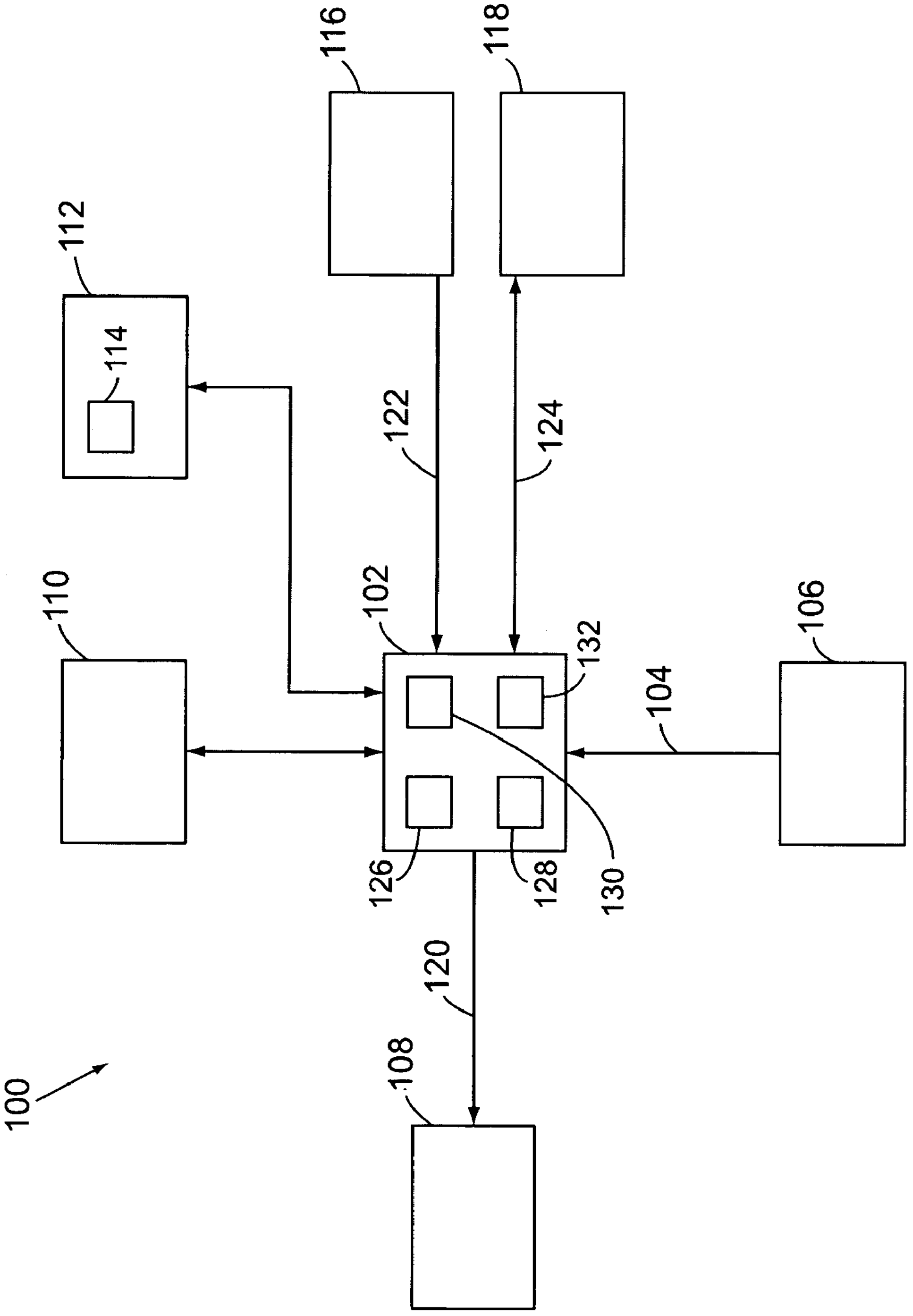
FIG. 1 is a block diagram of an effluent concentration calculation system according to one embodiment.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It should be noted that although one or more embodiments may be described in connection with a filter cartridge for an air purifying respirator, the embodiments described herein are not limited to air purifying respirators. In particular, one or more embodiments may be implemented in connection with different types of filtration systems, including, for example, air filtration systems for buildings. Moreover, while one or more embodiments may be described as being implemented using one or more computer devices or systems, the embodiments described herein are not limited to computer-based systems and methods. In particular, one or more embodiments may be implemented in connection with non-computer based devices and methods. For example, while one embodiment includes calculating a breakthrough time or a service life of a filter cartridge based on one or more parameters input by a user into a computer-based system, the breakthrough time or service life may be calculated using a slide rule or a wheel calculator. The slide rule or wheel calculator can provide a breakthrough time or service life based on various known inputs.

Example embodiments of systems and methods for calculating and displaying information are described in detail below. In particular, a detailed description of example systems and methods for dynamically determining and displaying effluent concentration profiles, breakthrough times and filter cartridge recommendations is provided. A technical effect of one or more of the embodiments described herein includes at least one of graphically displaying a breakthrough time and/or effluent concentration profile based on one or more parameters input by a user, dynamically adjusting the breakthrough time and/or effluent concentration profile based on changed inputs from a user, recommending a filter cartridge to a user based on input from a user, and dynamically altering a recommended filter cartridge based on changed inputs from a user.

Figure 6:
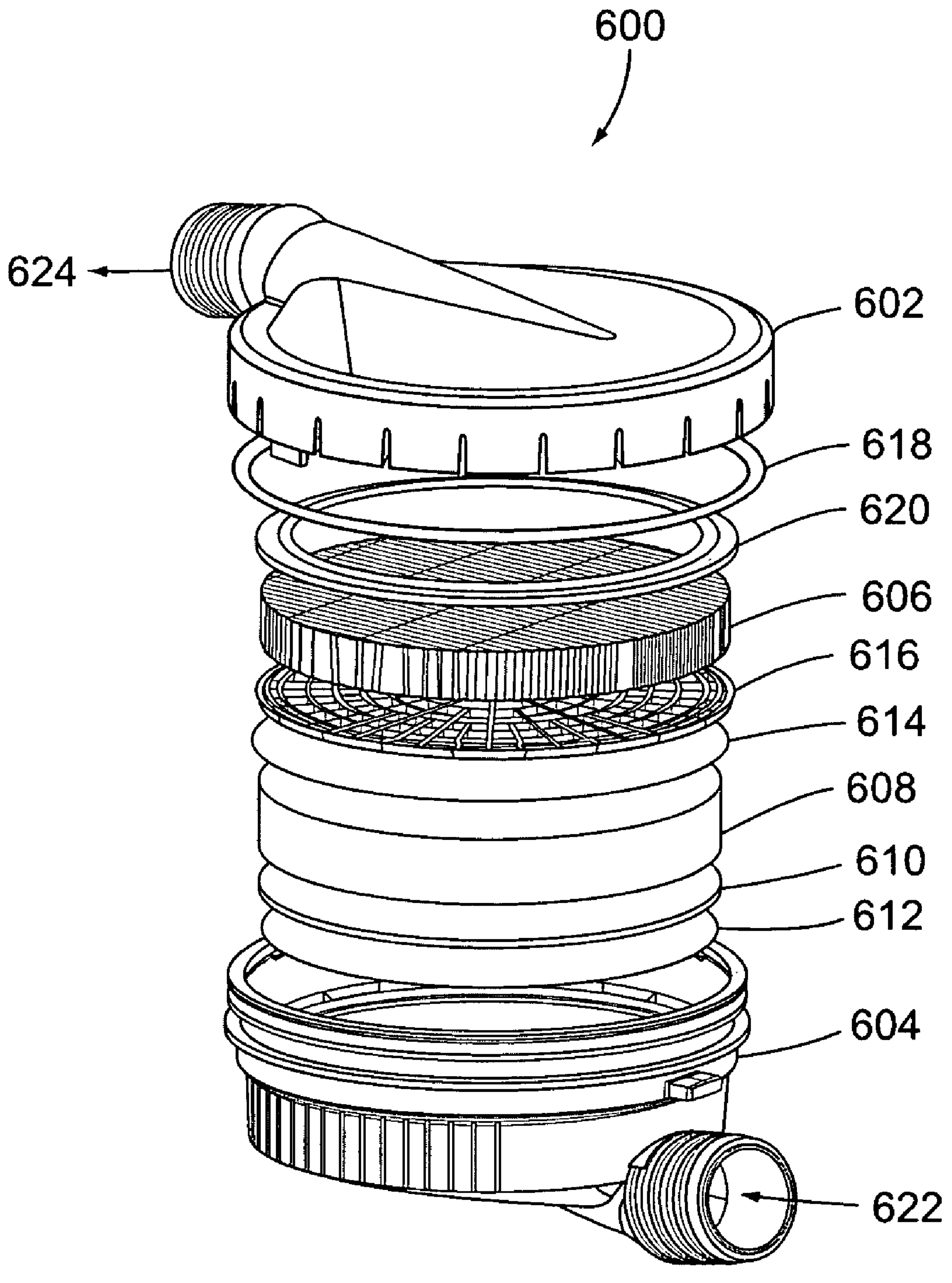
FIG. 6 is an exploded view of a filter cartridge according to example embodiment.

FIG. 6 is an exploded view of a filter cartridge 600 according to example embodiment. The filter cartridge 600 includes top and bottom bodies 602, 604 that house a filter bed 606. The filter bed 606 may include, for example, activated carbon impregnated with one or more chemicals. A plurality of additional filter layers 608, 610 may each include additional layers of activated carbon. Retention elements 612, 614 may hold the filter layers 608, 610 within the filter cartridge 600. A screen 616 mechanically filters aerosol particles passing through the filter cartridge 600. A sealing element 618 and& an adhesive 620 are provided to seal the filter cartridge 600 in an assembled state. In operation, air passes through an intake port 622 in the bottom body 604 and passes through the filter layers 608, 610 and the filter bed 606. As the air passes through the filter layers 608, 610 and the filter bed 606, one or more chemical contaminants in the air may be filtered out or adsorbed to the material in the filter layers 608, 610 and/or the filter bed 606. The filtered air continues through the filter cartridge 600 and out of the filter cartridge 600 through a port 624 in the top body 602. The filtered air may then be communicated to a user through one or more tubes or pipes, for example. The effectiveness of the filter bed 606 may decrease with continued use. For example, as more and more contaminated air passes through the filter bed 606 and/or as higher concentrations of chemical contaminants pass through the filter bed 606, the filter bed 606 becomes less effective in filtering out the chemical contaminants. Eventually, the concentration of the chemical contaminants passing through the filter bed 606 may exceed a maximum allowable concentration. The time at which this occurs may be referred to as the breakthrough time or service life of the filter cartridge 600. Once the breakthrough time or service life of the filter cartridge 600 has passed, the filter cartridge 600 may no longer be usable to protect the user from the chemical contaminants.

FIG. 1 is a block diagram of an effluent concentration calculation system 100 according to one embodiment. The system 100 includes a processor module 102 that receives, among other things, input 104 from a user at a user interface 106 and determines at least one of an effluent concentration profile 204 (shown in FIG. 2), a breakthrough time 206 (shown in FIG. 2), and a filter cartridge recommendation 240 (shown in FIG. 2). The effluent concentration profile 204 includes a graphical representation of the concentration of one or more chemical species that pass through a filter bed of a filter cartridge over time. In one embodiment, the effluent concentration profile 204 represents the concentration of one or more chemical species at one end of the filter bed 606 (shown in FIG. 6) with respect to time. For example, the effluent concentration profile 204 represents the concentration of a chemical species at the end of the filter bed 606 that is closest to the port 624 (shown in FIG. 6) in the top body 602 (shown in FIG. 6) of the filter cartridge 600 (shown in FIG. 6). In such an example, the effluent concentration profile 204 represents the approximate concentration of the chemical species that passes through the filter cartridge 600 to the user of the filter cartridge 600. The breakthrough time 206 includes a time at which a given concentration of one or more chemical species breaks through the filter cartridge from the surrounding environment and reaches a user of the filter cartridge. The filter cartridge recommendation 240 includes one or more filter cartridges recommended to the user based on criterion set forth by the user.

In another embodiment, the processor module 102 receives input 104 from the user at the user interface 106 and determines a bed profile. The bed profile is a graphical representation of the concentration of one or more chemical species in the filter bed 606 (shown in FIG. 6) with respect to the position in the filter bed 606. For example, the bed profile may graphically illustrate the concentration of a chemical species in the filter bed 606 with respect to various positions in the thickness of the filter bed 606 at a given time. The processor module 102 determines the bed profile for a variety of times in one embodiment. The movement of the chemical species through the filter bed 606 may then be visualized by comparing a plurality of bed profiles generated by the processor module 102 at increasing time periods.

The processor module 102 and the user interface 106 are directly or indirectly communicatively coupled with one another through one or more wired, wireless, or network (such as a LAN, WAN, Internet or intranet) connections. The user interface 106 includes a device, system or apparatus capable of communicating one or more input parameters and communicating the input parameters as the input 104 to the processor module 102. For example, the user interface 106 can include one or more of a keyboard, mouse, stylus, touch-sensitive screen, microphone, and the like. In another example, the user interface 106 includes a stand-alone computing device such as a PC, a laptop computer, a smart phone, and the like. In one embodiment, the processor module 102 and the user interface 106 communicate with one another through one or more network connections (including the Internet). For example, the system 100 may be an Internet-based system that employs a web browser as the user interface 106.

In the illustrated embodiment, the processor module 102 is communicatively coupled to a computer-readable storage medium 110. The computer-readable storage medium 110 may include one or more computer-readable memories capable of storing data, such as a hard drive, RAM, ROM, flash memory, CD drive, DVD drive, and the like. The computer-readable storage medium 110 may directly or indirectly communicate with the processor module 102 through one or more wired, wireless, or network (such as a LAN, WAN, Internet, or intranet) connections. In another embodiment, a plurality of computer-readable storage mediums is communicatively coupled to the processor module 102. For example, an additional computer-readable storage medium 112 may be communicatively coupled to the processor module 102. The computer-readable storage medium 112 may include a database 114 that stores one or more parameters usable by the processor module 102 to determine at least one of the effluent concentration profile 204 (shown in FIG. 2), the breakthrough time 206 (shown in FIG. 2), and the filter cartridge recommendation 240 (shown in FIG. 2).

The processor module 102 is communicatively coupled to an output device 108. The output device 108 includes a device, system or apparatus capable of receiving the effluent concentration profile 204, the breakthrough time 206, the filter cartridge recommendation 240, a bed profile and/or data representative of the effluent concentration profile 204, the breakthrough time 206, the filter cartridge recommendation 240 and/or the bed profile and presenting the same to the user. For example, the output device 108 can include a CRT display, a printer, a mobile display unit such as a Palm Pilot, mobile phone, Blackberry, and the like, a computer memory, an LCD screen, and the like. In one embodiment, the processor module 102 and the output device 108 communicate with one another through one or more network connections (including the Internet). For example, the system 100 may be an Internet-based system that employs a web browser as the output device 108. The processor module 102 communicates the effluent concentration profile 204, the breakthrough time 206, the filter cartridge recommendation 240 and/or data representative of the same as output 120 to the output device 108. A plurality of the processor module 102, user interface 106 and output device 108 are physically separate components of the system 100 in one embodiment. Alternatively, a plurality of the processor module 102, user interface 106 and output device 108 are combined into a single component. For example, the processor module 102 and the output device 108 may be provided as one or more microprocessors and an LCD screen housed within an air respirator.

In one embodiment, the processor module 102 is communicatively coupled to an active sensor 116. The active sensor 116 includes a powered device configured to sense or measure data relevant to one or more parameters. The data or parameters are usable by the processor module 102 to determine at least one of the effluent concentration profile 204, the breakthrough time 206, and the filter cartridge recommendation 240. The processor module 102 and active sensor 116 may be directly or indirectly connected through one or more wired, wireless, or network (such as a LAN, WAN, Internet, or intranet) connections. The active sensor 116 may proactively report measured or sensed data to the processor module 102 as input 122. For example, the active sensor 116 may be a powered sensor capable of communicating parameters to the processor module 102 as input 122.

In one embodiment, the processor module 102 is communicatively coupled to a passive sensor 118. The passive sensor 118 includes a non-powered device configured to sense data relevant to one or more parameters. The data or parameters are usable by the processor module 102 to determine at least one of the effluent concentration profile 204, the breakthrough time 206, and the filter cartridge recommendation 240. The processor module 102 and passive sensor 118 may be directly or indirectly connected through one or more wired, wireless, or network (such as a LAN, WAN, Internet, or, intranet) connections. The processor module 102 may measure the data or parameters from the passive sensor 118 as input 124.

The processor module 102 includes a plurality of sub-modules, including a recommended filter cartridge sub-module 126, an effluent concentration profile sub-module 128, a breakthrough time sub-module 130, and an output sub-module 132. The processor module 102 is illustrated conceptually as a collection of sub-modules 126 through 132, but may be implemented utilizing any combination of dedicated hardware boards, DSPs, processors, etc. Alternatively, the processor module 102 and/or the sub-modules 126 through 132 may be implemented utilizing an off-the-shelf PC with a single processor or multiple processors, with the functional operations distributed between the processors. As a further option, the sub-modules 126 through 132 may be implemented utilizing a hybrid configuration in which certain modular functions are performed utilizing dedicated hardware, while the remaining modular functions are performed utilizing an off-the-shelf PC and the like. The sub-modules 126 through 132 also may be implemented as software modules within a processing unit.

The operations of the sub-modules 126 through 132 may be controlled by the processor module 102. The sub-modules 126 through 132 may perform mid-processor operations, for example. The recommended filter cartridge sub-module 126 receives one or more input parameters (described below), accesses any of a list, table, database, and the like, of available filter cartridges, and recommends one or more filter cartridges in the list based on the input parameters. For example, the user may input several criteria for a filter cartridge as one or more input parameters described below. The recommended filter cartridge sub-module 126 receives these criteria and narrows down the list of all potential filter cartridges. Based on these criteria and the remaining filter cartridges, the recommended filter cartridge sub-module 126 selects one or more filter cartridges to recommend to the user. The initial list of possible filter cartridges to recommend may be stored in one or more of the computer-readable storage media 110, 112.

The effluent concentration profile ("ECP") sub-module 128 receives one or more input parameters (described below) and calculates the effluent concentration profile or curve 204

(shown in FIG. 2) and/or a bed profile. For example, the user may input several parameters for calculating the effluent concentration profile for a filter cartridge in an environment with one or more chemical contaminants at one or more concentrations. The ECP sub-module 128 receives these parameters and calculates an effluent concentration profile 204 based on the parameters and one or more mathematical models for calculating the effluent concentration profile 204 based on the parameters. In one embodiment, the ECP sub-module 128 obtains one or more default values for any parameters or variables required by the mathematical model used to calculate the effluent concentration profile 204 but that is not input by the user. For example, the ECP sub-module 128 may obtain the default values for any variables not input by the user from one or more of the computer-readable storage media 110, 112.

The breakthrough time sub-module 130 receives one or more input parameters (described below) and calculates a breakthrough time 206 (shown in FIG. 2). For example, the user may input several parameters for calculating the service life of a filter cartridge in an environment with one or more chemical contaminants at one or more concentrations. The breakthrough time sub-module 130 receives these parameters and calculates a breakthrough time 206 based on the parameters and one or more mathematical models for calculating the breakthrough time 206 based on the parameters. In one embodiment, the breakthrough time sub-module 130 obtains one or more default values for any parameters or variables required by the mathematical model used to calculate the breakthrough time 206 but that is not input by the user. For example, the breakthrough time sub-module 130 may obtain the default values for any variables not input by the user from one or more of the computer-readable storage media 110, 112.

The output sub-module 132 communicates the output of one or more of the sub-modules 126 through 130 (described above) to the output device 108 as the output 120. The output sub-module 132 may cause the output 120 to graphically display the output 120, to print the output 120, or to otherwise communicate the output 120 to the user of the system 100.

In operation, the processor module 102 receives one or more parameters and uses the parameters to generate the effluent concentration profile 204, the breakthrough time 206, a bed profile at one or more times, and/or the filter cartridge recommendation 240. In a first operational mode referred to as a service life calculation mode, the processor module 102 obtains or receives one or more parameters to determine one or more of the effluent concentration profile 204 and the breakthrough time 206. In a second operational mode referred to as a cartridge selection mode, the processor module 102 obtains or receives one or more parameters to determine a recommended filter cartridge. The processor module 102 may perform both the service life calculation mode and the cartridge selection mode concurrently or separately.

In the service life calculation mode, the effluent concentration profile 204 or the breakthrough time 206 can be used to represent the service life of a filter cartridge based on the parameters. For example, based on the input parameters, the processor module 102 can determine how long a filter cartridge can be used before one or more chemical contaminants breakthrough the filter at an unsafe level and reach the user. The input parameters used by the processor module 102 in the service life calculation mode include, but are not limited to, one or more use condition parameters. The use condition parameters include data or information relevant to the manner in which a filter cartridge is or will be used. For example, the use condition parameters may include, but are not limited to, one or more of a cartridge type, a chemical contaminant, a chemical concentration, an occupational exposure limit, and a site condition.

The cartridge type is the type of filter cartridge that is being used or that is desired to be used. For example, a cartridge type that is desired by a user to be included in an air respirator can be input by a user at the user interface 106 and communicated to the processor module 102 as the input 104. In another example, the active sensor 116 can determine what filter cartridge is being used by a user and communicate the cartridge type to the processor module 102 as the input 122. In another example, the cartridge type can be determined by the processor module 102 based on a user's preference for a particular type of respirator and/or a particular particulate protection level. The type of respirator can include the make and/or model of the air respirator in which the filter cartridge is used or will be used. The particulate protection level can include the amount of chemical particulates that the user deems can be allowed to pass through the filter cartridge to the user. The type of respirator and/or particulate protection level can be input by a user with the user interface 106 and communicated as the input 104. Alternatively, the type of respirator can be determined by one or more of the active and passive sensors 116, 118 and communicated to the processor module 102 as the input 122, 124. Based on the type of respirator and/or particulate protection level, the processor module 102 can narrow down a list of all potential filter cartridges available to a user. A list of available filter cartridges can be stored at one or more of the computer-readable storage media 110, 112. The processor module 102 can access the list and eliminate those filter cartridges that do not meet the criteria defined by the type of respirator and/or particulate protection level. For example, some filter cartridges in the list may not work in the type of respirator input to the processor module 102. Based on the narrowed list of potential filter cartridges, the processor module 102 can determine the effluent concentration profile 204 and/or the breakthrough time 206 for one or more filter cartridges in the narrowed list. Alternatively, the processor module 102 can present the narrowed list of filter cartridges to the user at the output device 108. The user can then select one or more filter cartridges from the list using the user interface 106.

The chemical contaminant is one or more chemical species that are to be filtered by the filter cartridge. The chemical contaminants can include those chemical species that are detected by the passive and/or active sensors 118, 116 and communicated to the processor module 102 as the input 124, 122. Alternatively, the chemical contaminants can include those chemical species input by a user with user interface 106 and communicated as the input 104.

The chemical concentration is the concentration of one or more of the chemical contaminants in an environment where the filter cartridge is used or will be used. For example, the chemical concentration may be a vapor, liquid and/or aerosol concentration. The chemical concentration can include the concentrations that are detected by the passive and/or active sensors 118, 116 and communicated to the processor module 102 as the input 124, 122. Alternatively, the chemical concentration can include the concentrations of those chemical species input by a user with user interface 106 and communicated as the input 104. In another embodiment, the chemical concentration is the maximum concentration of one or more of the chemical contaminants that passes, or breaks through, a filter cartridge. This maximum concentration may be referred to as a breakthrough concentration. The processor module 102 may obtain a default value for the chemical concentration parameter. For example, the processor module 102 may obtain a default value for the chemical concentration of a chemical contaminant input by the user from one or more of the computer-readable storage media 110, 112. The default value for the chemical concentration parameter may be associated with one or more of the other parameters input by the user. For example, the default value used for the chemical concentration may be different for different chemical contaminants and/or cartridge types that are input by the user. The association between various default values for one or more of the chemical concentration parameters and the input parameters from the user may be stored in a table, database, or other memory structure in at least one of the computer-readable storage media 110, 112.

The occupational exposure limit includes one or more limits on the amount or concentration of one or more chemical contaminants in an environment that a filter cartridge is to be used. For example, the occupational exposure limit may be a legally mandated limit on the amount or concentration of a chemical contaminant that a human being may be exposed to during a particular time period. The occupational exposure limit may be input by a user at the user interface 106 and communicated as the input 104. Alternatively, the occupational exposure limit may be stored at the computer-readable storage medium 110 and/or 112 and obtained by the processor module 102 from the same. The processor module 102 may obtain a default value for the occupational exposure limit parameter. For example, the processor module 102 may obtain a default value for the occupational exposure limit from one or more of the computer-readable storage media 110, 112. The default value for the occupational exposure limit parameter may be associated with one or more of the other parameters input by the user. For example, the default value used for the occupational exposure limit may be different for different chemical contaminants and/or cartridge types that are input by the user. The association between various default values for the occupational exposure limit parameter and one or more other input parameters from the user may be stored in a table, database, or other memory structure in at least one of the computer-readable storage media 110, 112.

The site condition parameter includes one or more parameters relevant to the environment in which a filter cartridge is being used or will be used. For example, an ambient pressure, temperature, and/or relative humidity may be communicated to the processor module 102 as a site condition parameter. In one embodiment, a breathing rate is communicated to the processor module 102 as a site condition parameter. The breathing rate is the breathing rate desired by a user or is a measured breathing rate of a user currently using a particular filter cartridge. One or more of the site conditions may be input by a user at the user interface 106 and communicated to the processor module 102 as the input 104. In one embodiment, the active and/or passive sensors 116, 118 measure or sense one or more site conditions and the site conditions are received by the processor module 102 as the input 122 and/or 124. The processor module 102 may obtain default values for one or more site condition parameters. For example, the processor module 102 may obtain a default value for the ambient pressure, temperature, relative humidity, and/or breathing rate from one or more of the computer-readable storage media 110, 112. The default value for the site condition parameter may be associated with one or more of the parameters input by the user. Different default values for one or more of the site condition parameters may be associated with different chemical contaminants and/or cartridge types input by the user. For example, the default value used for the breathing rate may be different for different chemical contaminants and/or cartridge types that are input by the user. The association between various default values for one or more of the site condition parameters and the input parameters from the user may be stored in a table, database, or other memory structure in at least one of the computer-readable storage media 110, 112.

In one embodiment, the user inputs a confidence level that is associated with one or more of the parameters. For example, the user may input a confidence level of 5% for one or more of the amnbient pressure, the breathing rate, the temperature, the relative humidity, the chemical concentration, and the like. Other confidence levels may be input by the user. In general, a larger confidence level indicates that the user has less confidence in the numeric value of the input parameter. For example, a confidence level of 5% for an input temperature parameter of 80 degrees Fahrenheit indicates that the user believes that the temperature parameter is between 76 and 84 degrees Fahrenheit. In comparison, a confidence level of 10% for the temperature parameter of 80 degrees Fahrenheit indicates that the user believes that the temperature parameter is between 72 and 88 degrees Fahrenheit.

In the service life calculation mode, the processor module 102 receives one or more of the use condition parameters and, based on the parameters and one or more mathematical models applied to the parameters, generates the effluent concentration profile 204 and/or the break through time 206. Either or both of the effluent concentration profile 204 and the breakthrough time 206 can be used to determine how long a particular cartridge can be used by the user in an environment and manner of use described by the, use condition parameters. For example, with a given type of filter cartridge to be used in an environment with particular chemical contaminants at given concentrations, the effluent concentration profile 204 and/or the breakthrough time 206 can be used to determine how long the cartridge can be used in the environment before one or more chemical contaminants breakthrough the filter cartridge and reach the user.

In one embodiment, the processor module 102 does not determine the effluent concentration profile 204 and/or the breakthrough time 206 until a minimum number or amount of the use condition parameters are received by the processor module 102. For example, the processor module 102 may not determine the effluent concentration profile 204 and/or the breakthrough time 206 until the cartridge type, the chemical contaminant(s) and the chemical concentration(s) are received by the processor module 102. In one embodiment, the processor module 102 obtains default values for any other parameters or variables that are required to generate the effluent concentration profile 204 and/or the breakthrough time 206. These default values may be obtained from one or more of the computer-readable storage media 110, 112.

The processor module 102 communicates the bed profile, the effluent concentration profile 204 and/or the breakthrough time 206 (of data representative of either) to the output device 108 as the output 120. The output device 108 provides the effluent concentration profile 204 and/or the breakthrough time 206 to the user. For example, the output device 108 may display the effluent concentration profile 204 and/or the breakthrough time 206 plotted on a graph. Alternatively, the output device 108 may display the effluent concentration profile 204 and/or the breakthrough time 206 as a tabular report provided to the user. In one embodiment, the processor module 102 determines the effluent concentration profile 204 and/or the breakthrough time 206 and the output device 108 presents the same to a user. The user may then alter, change or add to the parameters input to the processor module 102. The processor module 102 then determines an updated version of the effluent concentration profile 204 and/or the breakthrough time 206 and the output device 108 presents the same to the user. For example, the user may change the parameters input to the processor module 102 and the processor module 102 dynamically changes or updates the effluent concentration profile 204 and/or the breakthrough time 206 in response thereto. By updating the effluent concentration profile 204 and/or the breakthrough time 206, the user may then visually see the impact of varying one or more parameters on the effluent concentration profile 204 and/or the breakthrough time 206.

In one embodiment, the processor module 102 determines at least one of a bed profile, the effluent concentration profile 204 and/or the breakthrough time 206 (or data representative, of any of the bed profiles, effluent concentration profiles 204 and/or breakthrough times 206) for each of a plurality of chemical species or contaminants and communicates the same to the output device 108 as the output 120. The output device 108 displays the plurality of bed profiles, effluent concentration profiles 204, and/or breakthrough times 206. For example, a plurality of effluent concentration profiles 204 may be displayed on a single graph, with each effluent concentration profile 204 representing the concentration of a different chemical species or contaminant. Alternatively, the processor module 102 determines, and the output device 108 displays, at least one bed profile, effluent concentration profile 204 and/or breakthrough time 206 for each of a plurality of different parameter scenarios. A parameter scenario includes a set of parameters input by the user. Different parameter scenarios may include different permutations of the potential input parameters that are input by the user. For example, different parameter scenarios may include one or more different chemical contaminants, different sets of chemical contaminants, different filter cartridges, and the like. The user may then easily visually compare the bed profiles, effluent concentration profiles 204, and/or breakthrough times 206 for different chemical contaminants and/or parameter scenarios at the same time.

A plurality of the parameter scenarios are saved and stored in one or more computer-readable storage media and are accessible by the processor module 102 in one embodiment. For example, several parameter scenarios may be stored in the computer-readable storage medium 110. The user may select one or more parameter scenarios to be communicated to the processor module 102. The parameters of the parameter scenario may be communicated to the output device 108 and presented to the user. The processor module 102 may then employ one or more of the parameters in the parameter scenario selected by the user to determine a bed profile, the effluent concentration profile 204 and/or the breakthrough time 206. In one embodiment, the user selects a parameter scenario previously input and saved by another user and then modifies one or more parameters in the parameter scenario, inputs additional parameters to the parameter scenario and/or removes one or more parameters from the parameter scenario. The processor module 102 may then determine the effluent concentration profile 204, for example, based on this modified parameter scenario.

In one embodiment, the processor module 102 determines at least one of a bed profile, the effluent concentration profile 204 and/or the breakthrough time 206 (or data representative of any of the bed profiles, effluent concentration profiles 204 and/or breakthrough times 206), for one or more values of an input parameter, with the values being within the range of values that fall within the confidence level for that input parameter. For example, if the user inputs the temperature parameter as being 80 degrees Fahrenheit with a confidence level of 5%, then the processor module 102 may determine a plurality of bed profiles, effluent concentration profiles 204 and/or breakthrough times 206 for a plurality of values that fall within 5% of 80 degrees Fahrenheit. These plural bed profiles, effluent concentration profiles 204 and/or breakthrough times 206 may be displayed simultaneously at the output device 108. Alternatively, the processor module 102 determines the bed profile, effluent concentration profile 204 and/or breakthrough time 206 for the value of the parameter within the confidence level that provides the safest, or most conservative, of the various bed profiles, effluent concentration profiles 204 and/or breakthrough times 206 that are determined using the range of the parameter values that fall within the confidence level. For example, the processor module 102 may determine that for a temperature parameter of 80 degrees Fahrenheit with a confidence level of 5%, or 76 to 84 degrees Fahrenheit, the shortest breakthrough time 206 for a plurality of temperatures between 76 and 84 degrees Fahrenheit occurs at a temperature parameter of 84 degrees Fahrenheit. In such an example, the processor module 102 communicates the shortest of the breakthrough times 206 to the output device 108 for presentation to the user. The processor module 102 thus may determine and the output device 108 may present a conservative bed profile, effluent concentration profile 204 and/or breakthrough time 206 as a safety limit based on the user's input confidence level.

The effluent concentration profile 204, the breakthrough time 206 and/or one or more bed profiles at a plurality of times may be calculated using any of a number of mathematical models that use one or more of the input parameters described above to determine the effluent concentration profile 204, the breakthrough time 206 and/or the bed profiles. For example, in one embodiment, a new model for determining the effluent concentration profile 204 is employed. This model, referred to as the Ding model, includes two hypotheses to an adsorption process: (a) for a well-developed, constant-feed, adsorption process, the dimensionless chemical potential may change exponentially with bed location and (b) the speed of the concentration wave accelerates with time when the wave evolves but from the bed. The Ding model may be capable of fitting experimental data over a wide range of concentrations of several orders of magnitude. The Ding model can be used as a predictive tool given the adsorption equilibrium and the sensitivities of the two parameters to certain operating conditions. The Ding model also may be applied to both adsorptive and reactive processes for air purification processes. The Ding model may be used to overcome several shortcomings in existing models. For example, the Ding model may be used to calculate service life at different toxicity levels, at different feed concentrations, and at different residual life times. The Ding model may be used to back-estimate an adsorption bed profile at different times in order to assist in designing filters. The Ding model may more accurately calculate the effluent concentration profiles and/or breakthrough times of chemical contaminants having relatively low molecular weights and/or boiling points.

In one embodiment, the mathematical model that is employed to calculate effluent concentration profiles and/or breakthrough times is based on a combination of parameters input by the user (as described above) and physical properties of the chemical contaminants sought to be filtered. The chemical contaminants may be input by the user, as described above. The physical properties of the chemical contaminants may be obtained from a computer-readable storage medium such as one or more of the computer-readable storage media 110, 112. For example, the computer-readable storage medium 112 may include a database that stores relevant physical properties of the chemical contaminants input by the user. The database also can include physical property data on other relevant chemicals and compounds. For example, the database can store physical property data on water and atmospheric air. The database of physical property data may be one or more of a public database, a private database and a custom database. With respect to a public database, the database may be a publicly accessible database available over the Internet. A private database may be a database that is accessible by a limited number of users. For example, the private database can be a database that is available over an intranet that is accessible only by those users that are authenticated through a login and password procedure. A custom database can be a database that obtains physical property data from a public and/or private database but that organizes and/or filters the data in a customized manner, for example.

For example, a database may include one or more properties for each chemical contaminant that could be selected by the user. These properties include, but are not limited to, one or more of a Chemical Abstracts Service ("CAS") registry number, a chemical formula, a molecular weight, a liquid density (in grams per cubic centimeter, for example), a molar polarity (in Pe, for example), a water solubility, a vapor model (Model 0 or Model 1, for example), one or more of vapor models A, B and C, a chemical name, a nickname or alias, an Immediately Dangerous to Life and Health ("IDLH") limit (in parts per million, for example), a Recommended Exposure Limit ("REL") (in parts per million, for example), a Permissible Exposure Limit ("PEL") (in parts per million, for example), a Threshold Limit Value ("TLV") (in parts per million, for example), and a comment. The comment can include any additional relevant information. In one embodiment, Model 0 of the vapor model may be a vapor model of the Antoine format and described by the following equation:

$$\log_{10}P,\ \text{bar} = A - \frac{B}{C+T,\ K} \qquad \text{(Eqn. 15)}$$

Model 1 of the vapor model may be a vapor model of the Antoine format and described by the following equation:

$$\ln P,\ torr = A - \frac{B}{C+T,\ K} \qquad \text{(Eqn. 16)}$$

The properties of the chemicals may be input by an administrator of the system 100. In one embodiment, one or more of the chemical properties are obtained from the NIST Web book, available at http://webbook.nist.gov/. One or more of the chemical properties may be obtained from the NIOSH IDLH guidebook or webpage, available at http://www.cdc.gov/niosh/idlh/intridl4.html. If a particular property is not available in the database and has not been provided by the user, the system may issue an audible and/or visual warning to the user.

The Ding model defines a chemical potential difference of a chemical contaminant sought to be filtered by a filter cartridge as:

$$\Phi = \frac{\varphi - \varphi_f}{\varphi_0 - \varphi_f} \equiv \frac{\ln C^*}{\ln C_0^*} \qquad \text{(Eqn. 1)}$$

where Φ is the difference between the local chemical potential of the chemical contaminant in the filter bed of a filter cartridge and the chemical potential of the chemical contaminant in the feed concentration, or the concentration in the environment in which the filter cartridge is used; Φ is the chemical potential of the chemical contaminant at a given location in the filter bed; Φf is the chemical potential of the chemical contaminant in the feed concentration; Φ0 is the chemical potential of the chemical contaminant at the front of the wave, or the breakthrough curve front, of the chemical contaminant as the chemical contaminant passes through the filter bed. $C_0$ is defined as the concentration of the chemical contaminant at the breakthrough curve front. C* and $C_0$* are defined as dimensionless variables referenced to the substantially constant or constant feed concentration ($C_f$). The chemical potential (Φ) may be defined as follows:

$$\Phi = RT\ln C \qquad \text{(Eqn. 2)}$$

In one embodiment, the breakthrough curve front may be arbitrarily defined so as to effectively eliminate the effect of any clean regions of the filter bed, or regions where there is substantially no concentration of the chemical contaminant. In such an embodiment, a dimensionless position (ζ) of the chemical contaminant and a dimensionless time (τ) associated with a particular position of the chemical contaminant in the filter bed may be defined as follows:

$$\zeta = \frac{z - z_0}{z_{ref} - z_0} \qquad \text{(Eqn. 3)}$$

$$\tau = \frac{t - t_0}{t_{ref} - t_0} \qquad \text{(Eqn. 4)}$$

where z is a position, or location, in the filter bed expressed in meters; $z_0$ is the position of the breakthrough curve front in the filter bed expressed in meters; $z_{ref}$ is the reference position in the filter bed expressed in meters; t is a time expressed in seconds; $t_0$ is the time in seconds at which the breakthrough curve front is located at the position $z_0$ in the filter bed; and $t_{ref}$ is the reference time expressed in seconds. In one embodiment, at the breakthrough wave front, both the cobra value ζ and the time τ are zero and a concentration (C) of the chemical contaminant at the breakthrough wave front is $C_0$, as described above. In this embodiment, at the reference point both the position (ζ) and the time (τ) are 1 and the concentration (C) is a reference concentration ($C_{ref}$). As the time (τ) increases and approaches infinity (∞), the concentration (C) equals the reference concentration ($C_{ref}$).

If the filter cartridge remains in the environment that includes the chemical contaminant, or as the constant feed of the chemical contaminant continues, Φ, or the difference between the local chemical potential of the chemical contaminant in the filter bed of a filter cartridge and the chemical potential of the chemical contaminant in the feed concentration, changes with the position in the filter bed. The change in Φ may be represented as follows:

$$\ln\Phi = \zeta\ln\Phi_{ref} \qquad \text{(Eqn. 5)}$$

where $\Phi_{ref}$ is the difference between the chemical potential of the chemical contaminant in the filter bed at the reference position and the chemical potential of the chemical contaminant in the feed concentration.

When the wave of the chemical contaminant evolves out of the filter bed in the filter cartridge, the position of the wave may accelerate with respect to time. The speed at which the wave evolves out of the filter bed may change with respect to time according to:

$$\upsilon^*=\tau^{(\zeta-1)} \quad \text{(Eqn. 6)}$$

where v* is the speed and zeta ($\zeta$) is an acceleration factor referred to as a "cobra value." Zeta ($\zeta$) is referred to as the cobra value due to the cobra-like shape of the effluent concentration profile 204 (shown in FIG. 2) for many chemical contaminants. In one embodiment, waves of chemical contaminants that evolve out of the filter bed at a substantially constant or decelerated speed (v*) have cobra values ($\zeta$) that are less than 1, while waves that evolve out of the filter bed with accelerated speeds (v*) have cobra values ($\zeta$) that are greater than 1. One or more cobra values ($\zeta$) may be determined empirically from data or input by the user. For example, at list of cobra values ($\zeta$) may be determined from experimental data and stored in one or more of the computer-readable storage media 110, 112 to be accessed by the processor module 102.

Accordingly, the position ($\zeta$) of the chemical contaminant may be represented as follows:

$$\zeta=\upsilon^*\tau=\tau^{\zeta} \quad \text{(Eqn. 7)}$$

Substituting Equation 6 into Equation 4 yields the following relationship:

$$\ln\Phi=\tau^{\varsigma}\ln\Phi_{ref} \quad \text{(Eqn. 8)}$$

Equation 7 is used with the Ding model to represent the general form of a bed profile and may be used alone or in combination with one or more of the other equations described herein to generate an effluent concentration profile. For example, the concentration of chemical contaminants at the end of the filter bed 606 (shown in FIG. 6) that is closest to the port 624 (shown in FIG. 6) of the filter cartridge 600 (shown in FIG. 6) may be calculated using the Ding model for a plurality of times. The concentration of the chemical contaminants at the end of the filter bed 606 may then be graphed with respect to time to illustrate the concentration of the chemical contaminants that breakthrough the filter bed 606.

A stoichiometric time ($t_s$) of the Ding model can be determined from the following:

$$t_s = t_0 + \int_{t_0}^{\infty} (1 - C^*)\, dt = t_0 + \int_{t_0}^{\infty}\left(1 - C_0^{*\left(\Phi_{ref}^{(\tau\varsigma)}\right)}\right)dt \quad \text{(Eqn. 9)}$$

In one embodiment, the reference point used for Equation 7 is arbitrarily defined. For example, for an arbitrary point 1 in an effluent concentration profile similar to the effluent concentration profile 204, Equation 8 becomes:

$$\ln\Phi_1=\tau_1^{\varsigma}\ln\Phi_{ref} \quad \text{(Eqn. 10)}$$

Applying Equation 8, the reference point may be represented in the following:

$$\ln\Phi = \frac{\tau^{\varsigma}}{\tau_1^{\varsigma}}\ln\Phi_1 = \left(\frac{t - t_0}{t_1 - t_0}\right)^{\varsigma}\ln\Phi_1 = \tau'^{\varsigma}\ln\Phi'_{ref} \quad \text{(Eqn. 11)}$$

where the superscript ' denotes a new reference point for the Ding model. Accordingly, different reference points may be selected for different applications without having to alter the values of one or more parameters in the Ding model.

In one embodiment, the Ding model may be used to determine the breakthrough time 206 by determining the effluent concentration profile 204 and comparing the effluent concentration profile 204 to a breakthrough concentration input by the user. For example, once an effluent concentration profile 204 is created by the processor module 102, the time at which the breakthrough concentration occurs in the effluent concentration profile 204 can be the breakthrough time 206. Alternatively, the Ding model may be used to directly calculate the breakthrough time 206. For example, the reference point described above may be set to be equal to the stoichiometric center defined in Equation 9 so that the breakthrough time 206 may be defined as:

$$t_s = \frac{q\rho_b V}{FC_f} \equiv t_r\Lambda \quad \text{(Eqn. 12)}$$

where q represents the loading of the chemical contaminant(s) in the filter bed, or the adsorption equilibrium, expressed in moles per kilogram; $p_b$ represents the density of the filter particles in the filter bed, expressed in kilograms per cubic meters; V represents the volume of the filter bed, expressed in cubic meters; F represents the flowrate of the chemical contaminant(s) through the filter bed, expressed in cubic meters per second; $t_r$ represents the breakthrough time 206, or the residence time; and Λ represents a separation ratio that is calculated at the feed concentration $C_f$. The value of the adsorption equilibrium (q) may be calculated from experimental data, simulated isotherm models, or input by the user. From Equation 12, the separation ratio (Λ) and the breakthrough time 206 ($t_r$) may be determined using the following equations:

$$\Lambda = \frac{q\rho_b}{C_f} \quad \text{(Eqn. 13)}$$

$$t_r = \frac{V}{F} \quad \text{(Eqn. 14)}$$

Alternatively, one or more other mathematical models other than the Ding model described above may be used to determine one or more of a bed profile, the effluent concentration profile 204 and the breakthrough time 206. For example, one or more of the; models described in Wood, Gerry O., Estimating *Service Lives of Organic Vapor Cartridges*, American Industrial Hygiene Association Journal (Jan. 1994), pp. 11-15; Wood, Gerry O., Moyer, Ernest S.; *A Review of the Wheeler Equation and Comparison of Its Applications to Organic Vapor Respirator Cartridge Breakthrough Data*, Am. Ind. Hyg. Assoc. J. 50(8): 400-407 (1989); Wood, Gerry O., *Estimating Service Lives of Air-Purifying Respirator Cartridges for Reactive Gas Removal*, J. of Occupational and Environmental Hygiene, 2:414-423 (2005); Wood, Gerry O., *Organic. Vapor Respirator Cartridge Breakthrough Curve Analysis*, J. of the International Society for Respiratory Protection, Winter 1992-1993 (collectively referred to as the "Wood model") may be used.

In one embodiment, one or more of the variables described above in connection with Equations 1 through 14 may be input into the processor module 102 by the user at the user interface 106. Alternatively, one or more of these variables may be obtained by the processor module 102 from one or both of the computer-readable storage media 110, 112. For example, a default value for a variable may be obtained from the computer-readable storage medium 110, as described above. In one embodiment, the processor module 102 may acquire data on the chemical contaminants from a public, private and/or custom database instead of requiring the user to input this data, as described above.

In the cartridge selection mode, the processor module 102 obtains or receives one or more parameters to determine a recommended filter cartridge. In one embodiment, the processor module 102 also may determine one or more of the effluent concentration profile 204 and the breakthrough time 206, as described above. The recommended filter cartridge is a filter cartridge that is recommended for a user to use based on the input parameters. The input parameters used by the processor module 102 in the cartridge selection mode include, but are not limited to, one or more cartridge selection parameters. One or more of the use condition parameters also may be used as input parameters. The cartridge selection parameters include data or information relevant to the usefulness or utility of a filter cartridge to the user. For example, the cartridge selection parameters may include, but are not limited to, one or more of a minimum service life, a comfort indicator, a price, an empirical result, an inventory, a regional requirement, a phasing out indication, a phasing in indication, and a flexibility of use parameter.

The minimum service life parameter includes the minimum service life of a filter cartridge that is desired to be used. For example, the user may input a minimum service life that the user requires for any filter cartridge that will be recommended by the processor module 102. The processor module 102 may use the minimum service life to eliminate one or more filter cartridges from a listing of all possible filter cartridges. For example, based on the minimum service life and one or more use condition parameters, the processor module 102 may determine the breakthrough time 206 for several filter cartridges do not meet or exceed the minimum service life input by the user. These filter cartridges are eliminated from the list of possible cartridges to recommend to the user. The minimum service life may be input as an amount of time or as a range of acceptable service life times. The minimum service life may be input using the user interface 106 and communicated to the processor module 102 as the input 104.

The comfort indicator includes information related to the ease of use of a filter cartridge. For example, the comfort indicator may be expressed as a weight of a filter cartridge and/or an inhalation resistance of a filter cartridge. The user may input the comfort indicator as a maximum weight and/or a maximum inhalation resistance of the filter cartridge that will be recommended by the processor module 102. The processor module 102 may use the comfort indicator(s) to eliminate one or more filter cartridges from a listing of all possible filter cartridges. For example, based on the maximum weight and/or maximum inhalation resistance, the processor module 102 may eliminate several filter cartridges from the list of possible cartridges to recommend to the user. The eliminated filter cartridges may have a weight that exceeds the maximum filter weight and/or an inhalation resistance that exceeds the maximum inhalation resistance. The comfort indicator can be input using the user interface 106 and communicated to the processor module 102 as the input 104.

The price parameter includes the cost to the user of a filter cartridge. For example, the price may be the current market cost to purchase a filter cartridge. The user may input the price as a maximum cost of the filter cartridge that will be recommended by the processor module 102. The processor module 102 may use the price to eliminate one or more filter cartridges from a listing of all possible filter cartridges. For example, based on the maximum cost input by the user, the processor module 102 may eliminate several filter cartridges from the list of possible cartridges to recommend to the user. The eliminated filter cartridges may have a cost that exceeds the maximum cost input by the user. The price can be input using the user interface 106 and communicated to the processor module 102 as the input 104.

The empirical result includes a recommendation of a filter cartridge to the user based on a previous recommendation of a filter cartridge based on one or more common input parameters. A plurality of empirical results from previous filter cartridge recommendations based on corresponding input parameters may be stored in the computer-readable storage medium 110 and/or 112 as a database or table, for example. The processor module 102 may query the database or table to determine if one or more cartridge selection parameters input by the user correspond to the cartridge selection parameters previously input by another user. If a sufficient number of cartridge selection parameters from a previous filter cartridge recommendation are substantially similar to the cartridge selection parameters currently input by the user, the processor module 102 may recommend the same filter cartridge as was previously recommended. In one embodiment, the number of common cartridge selection parameters that is required before a filter cartridge is recommended based on an empirical result can be modified by the user.

The inventory parameter includes an amount of available filter cartridges. For example, one or more filter cartridges that could be recommended to the user by the processor module 102 may be out of stock or otherwise unavailable. The processor module 102 may consider the inventory of available filter cartridges and remove the filter cartridges that are out of stock from the list of all filter cartridges to recommend to the user. In doing so, the processor module 102 avoids recommending an unavailable filter cartridge to the user. The processor module 102 may access the inventory of available filter cartridges from a database or list of available filter cartridges stored at one or more of the computer-readable storage media 110, 112.

The regional requirement parameter includes a regional filter cartridge requirement. For example, various governments and/or jurisdictions may have varied minimum requirements for filter cartridges. These minimum requirements may be stored in one or more of the computer-readable storage media 110, 112 and accessible to the processor module 102. The processor module 102 may access relevant regional requirements to eliminate one or more filter cartridges from set of available filter cartridges. For example, one or more filter cartridges may not meet or exceed the requirements of a particular jurisdiction. The processor module 102 may eliminate these filter cartridges from the list of possible filter cartridges to recommend to the user. In one embodiment, the processor module 102 may determine regional requirements for the user by obtaining the Internet Protocol ("IP") address of the user. For example, the processor module 102 may obtain the IP address of the user interface 106 employed by the user to input the cartridge selection parameters. Based on this IP address, the processor module 102 can determine what regional requirements may apply to the user and eliminate any filter cartridges that do not meet or exceed these regional requirements.

The phasing out indication includes an indication that one or more filters are in the process of being removed from the market. For example, a filter cartridge may be associated with data that indicates that the filter cartridge is no longer being manufactured and the existing inventory of the filter cartridge is the remaining inventory of the filter cartridge. The phasing out indications for the filter cartridges may be stored in a list, table or database stored in one or more of the computer-readable storage media 110, 112. The processor module 102 may consider the phasing out of available filter cartridges and remove the filter cartridges that are being phased out from the list of all filter cartridges to recommend to the user. In doing so, the processor module 102 avoids recommending a filter cartridge that is being phased out to the user.

The phasing in indication includes an indication that one or more filters are in the process of being introduced to the market. For example, a filter cartridge may be associated with data that indicates that the filter cartridge is relatively new and is being phased in to be used in a particular market or industry. The phasing in indications for the filter cartridges may be stored in a list, table or database stored in one or more of the computer-readable storage media 110, 112. The processor module 102 may consider the phasing in of filter cartridges and recommend only the filter cartridges that are being phased in.

The flexibility of use parameter includes an indication of the number of air respirators that may be able to use a particular filter cartridge. For example, a flexibility of use parameter may include a number of air respirators with which a filter cartridge is compatible. Alternatively, the flexibility of use parameter may be a relative indication of how many air respirators may use a particular filter cartridge. For example, if a first filter cartridge may be used with more air respirators than a second filter cartridge, then the first filter cartridge may be associated with a larger flexibility of use parameter than the second filter cartridge. The flexibility of use parameter may be associated with each of a plurality of filter cartridges in a list, table, database, and the like, in one or more of the computer-readable storage media 110, 112, for example.

In the cartridge selection mode, the processor module 102 receives one or more of the cartridge selection parameters and, based on the parameters recommends one or more filter cartridges to the user. For example, the processor module 102 may access a list of filter cartridges from the computer-readable storage medium 110 and/or 112. Based on the cartridge selection parameters input by the user and/or accessed by the processor module 102, the processor module 102 eliminates one or more filter cartridges from thee list of filter cartridges. The processor module 102 may recommend one or more filter cartridges that remain in the list after eliminating those filter cartridges that do not meet the parameters input by the user. In one embodiment, the processor module 102 also receives one or more use condition parameters. The processor module 102 may employ the use condition parameters to determine the breakthrough time 206 of one or more filters in the list. The processor module 102 may recommend only those filters that meet the criteria set forth in the cartridge selection parameters and have a sufficiently great breakthrough time 206. The sufficiently great breakthrough time 206 may be a minimum breakthrough time, for example In one embodiment, the processor module 102 does not recommend a filter cartridge until a minimum number or amount of the cartridge selection parameters and/or use condition parameters are received by the processor module 102. For example, the processor module 102 may not determine a recommended filter cartridge until at least one cartridge selection parameter, the cartridge type, the chemical contaminant(s) and the chemical concentration(s) are accessible and/or received by the processor module 102.

The processor module 102 communicates the recommended filter cartridge(s) (or data representative of the recommended filter cartridge(s)) to the output device 108 as the output 120. The output device 108 provides the recommended filter cartridge(s) to the user. For example, the output device 108 may display an image of a recommended filter cartridge to the user. In one embodiment, the processor module 102 determines a recommended filter cartridge and the output device 108 presents the same to a user. The user may then alter, change or add to the parameters input to the processor module 102. The processor module 102 then determines if the recommended filter cartridge needs to be updated. If so, the processor module 102 provides an updated filter cartridge recommendation and the output device 108 presents the same to the user. For example, the user may change the parameters input to the processor module 102 and the processor module 102 dynamically changes or updates the recommended filter cartridge in response thereto.

Figure 2:
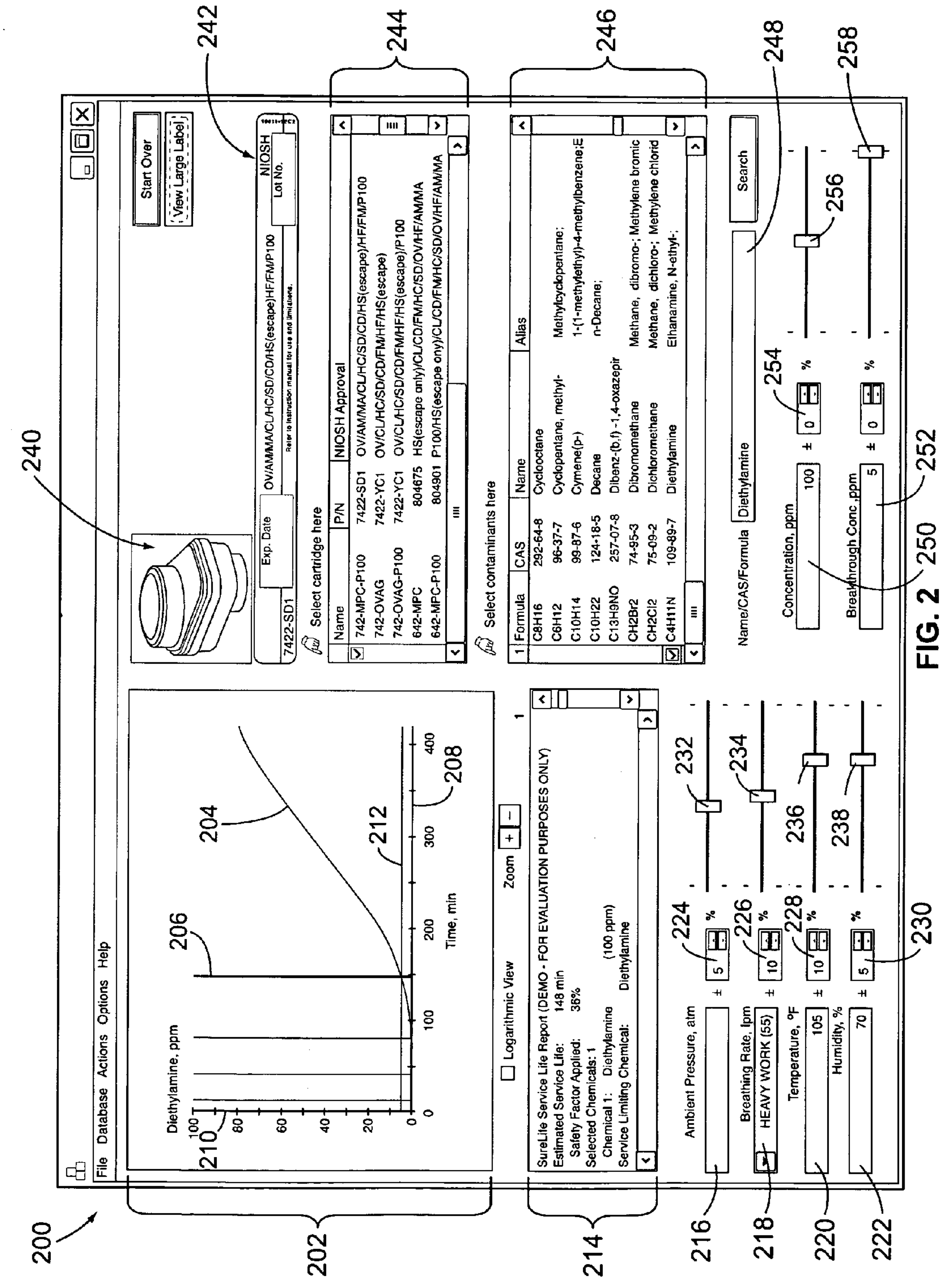
FIG. 2 is an illustration of a graphical user interface used to enter one or more parameters into the system shown in FIG. 1 and to display output shown in FIG. 1 to a user according to one embodiment.

FIG. 2 is an illustration of a graphical user interface 200 used to enter one or more parameters into the system 100 shown in FIG. 1 and to display output 120 (shown in FIG. 1) to a user according to one embodiment. The graphical user interface 200 may be displayed to a user at the output device 108. (shown in FIG. 1). The user employs an input device at the user interface 106 (shown in FIG. 1) to manipulate one or more buttons, slide, menus, lists, and the like in the graphical user interface 200. While FIG. 2 illustrates one embodiment of a graphical user interface for submitting the input 104 (shown in FIG. 1) to the processor module 102, other embodiments of graphical user interfaces with different layouts and graphical presentations are possible.

The graphical user interface 200 includes a graph window 202. In the illustrated embodiment, the graph window 202 displays the effluent concentration profile 204 and the breakthrough time 206. The effluent concentration profile 204 may be represented as a plot of data in a graph defined by a time axis 208 and a concentration axis 210. The breakthrough time 206 may be represented on the same graph. The data used to generate the effluent concentration profile 204 may be created by the processor module 102 (shown in FIG. 1) based on a mathematical model and one or more parameters input by the user, as described above. The breakthrough time 206 may be determined by the processor module 102 by calculating a breakthrough concentration 212 and determining the time at which the effluent concentration profile 204 exceeds the breakthrough concentration 212. The breakthrough concentration 212 may be input by the user or may be obtained from one or more of the computer-readable storage media 110, 112 (shown in FIG. 1). For example, the breakthrough concentration 212 may be based on, or substantially similar to, the occupational exposure limit and/or the particulate protection level input by the user, as described above.

A summary window 214 provides a summary of the parameters input by the user and/or the breakthrough time 206 calculated by the processor module 102 in one embodiment. For example, the summary window 214 may list the breakthrough time 206, the chemical contaminant input by the user, and the chemical concentration input by the user.

A user can input one or more parameters described above into a plurality of parameter windows 216, 218, 220, 222. In the illustrated embodiment, the user can input the ambient pressure in the parameter window 216, the breathing rate in the parameter window 218, the ambient temperature in the parameter window 220, and the relative humidity in the parameter window 222. The user may use a keyboard, stylus, and the like to textually input the parameters into the parameter windows 216, 218, 220, 222 and/or may select a value for a parameter from a drop down menu. For example, the parameter window 218 can provide a drop down menu for a user to select a breathing rate. The user can select a variance to one or more of the parameters input in the parameter window 216, 218, 220, 222 in one or more of the variance windows 224, 226, 228, 230. For example, the user can input a percentage in one of the variance windows 224, 226, 228, 230 to indicate an acceptable variance for a parameter in a corresponding parameter window 216, 218, 220, 222. In one embodiment, the confidence value associated with the corresponding input parameter is input by the user using the variance windows 224, 226, 228, 230. For example, the user may input a confidence value of 5%. in the variance window 224 for the ambient pressure parameter that is input in the parameter window 216, a confidence value of 10% in the variance window 226 for the breathing rate parameter that is input in the parameter window 218, a confidence value of 10% in the variance window 228 for the temperature parameter that is input in the parameter window 220, and a confidence value of 5% in the variance window 230 for the humidity parameter that is input in the parameter window 222, as shown in the illustrated embodiment. One or more slider bars 232, 234, 236, 238 may be moved or manipulated by the user to change a corresponding parameter value that is input in the parameter windows 216, 218, 220, 222.

The filter cartridge recommendation 240 is presented to the user on the graphical user interface 200 in one embodiment. As described above, the filter cartridge recommendation 240 includes a recommended filter cartridge selected by the processor module 102 (shown in FIG. 1) based on one or more input parameters from the user. In one embodiment, the filter cartridge recommendation 240 can be presented as an image of the recommended filter cartridge, as shown in the illustrated embodiment. Alternatively, the filter cartridge recommendation 240 may include one of more images of one or more filter cartridges selected by a user. A filter cartridge label 242 may be displayed on the graphical user interface 200 in one embodiment. For example, an image of the filter cartridge label 242 that corresponds to the filter cartridge recommendation 240 may be displayed on the graphical user interface 200. Alternatively, the filter cartridge label 242 may include one or more images of one or more labels for filter cartridges selected by a user.

A cartridge list window 244 provides a list of filter cartridges that are selectable by the user in one embodiment. The user may select one or more filter cartridges from the cartridge list window 244. For example, the user may input the cartridge type parameter described above by selecting one or more cartridges provided in the cartridge list window 244. The filter cartridges listed in the cartridge list window 244 may be limited based on one or more of the cartridge selection parameters input by a user, as described above.

A contaminant list window 246 provides a list of chemical contaminants that are selectable by the user in one embodiment. The user may select one or more chemical contaminants from the contaminant list window 246. For example, the user may input the chemical contaminant parameter described above by selecting one or more chemical contaminants provided in the contaminant list window 246.

In one embodiment, a contaminant search window 248 allows the user to type in one or more chemical contaminants so that the processor module 102 searches for a corresponding chemical contaminant. For example, instead of reviewing a list of chemical contaminants provided in the contaminant list window 246, the user may type in the name of a chemical contaminant in the contaminant search window 248 to input the chemical contaminant parameter to the processor module 102.

A chemical concentration window 250 allows the user to input the chemical concentration parameter described above. The user may input an acceptable variance for the chemical concentration parameter using a variance window 254. In one embodiment, the user inputs a confidence value in the variance window 254, similar to as described above with respect to the variance windows 224, 226, 228, 230. For example, the user may input a confidence value of 0% in the variance window 254 that corresponds to the chemical concentration parameter that is input in the chemical concentration window 250. A breakthrough concentration window 252 allows the user to input the breakthrough concentration 212 described above. One or both of the chemical concentration parameter and the breakthrough concentration 212 may be adjusted by the user by sliding one or both of slider bars 256, 258.

As described above, once the processor module 102 (shown in FIG. 1) has determined the effluent, concentration profile 204, the breakthrough time 206 and/or the recommended filter cartridge 240 based on input parameters from the user, the processor module 102 may dynamically update one or more of the effluent concentration profile 204, the breakthrough time 206 and the recommended filter cartridge 240 if the user changes or updates one or more of the input parameters. For example, if the user changes the chemical contaminant parameter by selecting a different chemical contaminant in the contaminant list window 246, the processor module 102 receives the updated chemical contaminant parameter and, if necessary, updates the effluent concentration profile 204, the breakthrough time 206 and/or the recommended filter cartridge 240 based on the updated chemical contaminant parameter.

Figure 3:
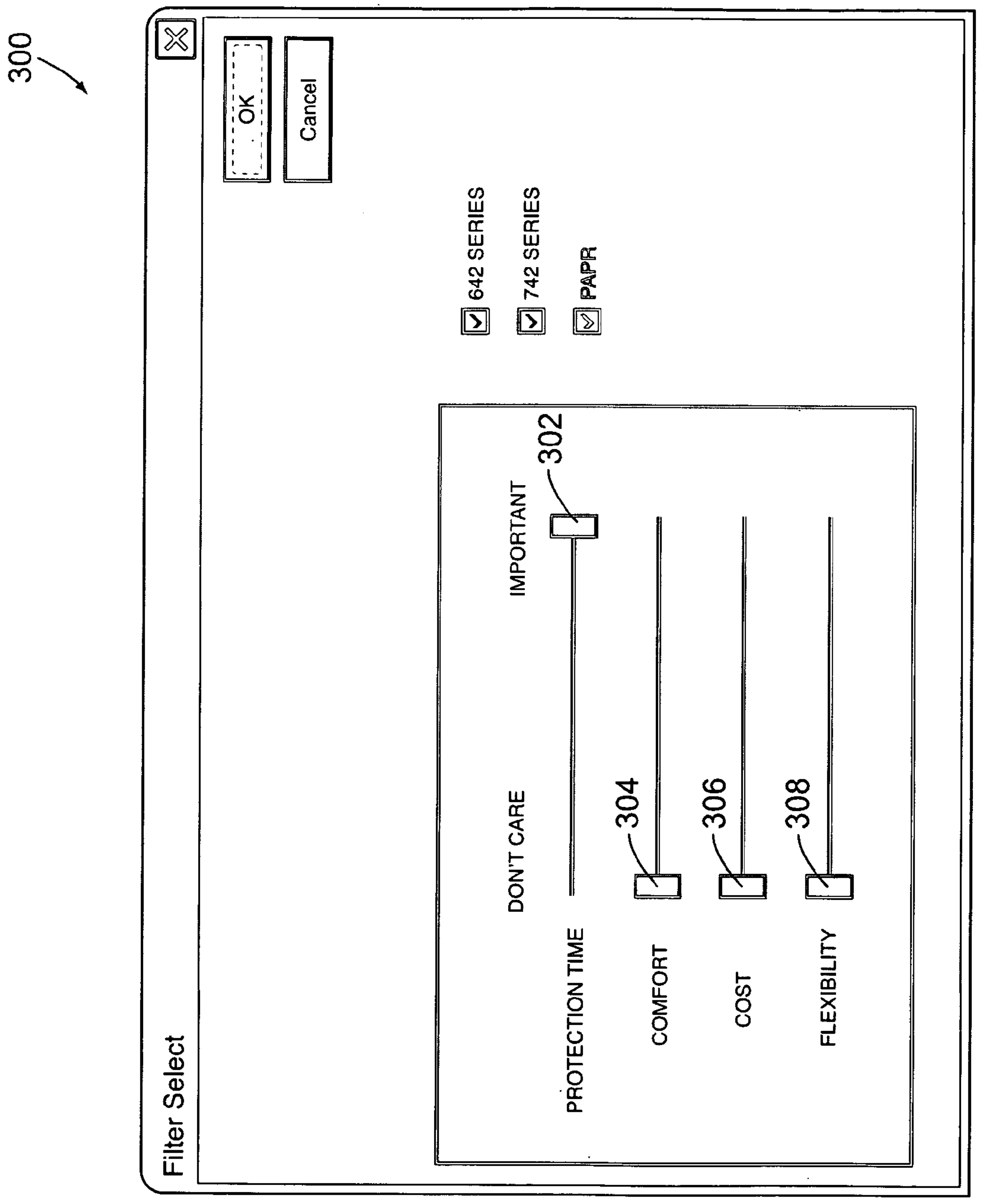
FIG. 3 is an illustration of a graphical user interface used to enter one or more parameters into the system shown in FIG. 1 according to one embodiment.

FIG. 3 is an illustration of a graphical user interface 300 used to enter one or more parameters into the system 100 shown in FIG. 1 according to one embodiment. Similar to the graphical user interface 200 (shown in FIG. 2), the graphical user interface 300 may be displayed to a user at the output device 108 (shown in FIG. 1). The user employs an input device at the user interface 106 (shown in FIG. 1) to manipulate one or more buttons and slides, and the like, in the graphical user interface 300. While FIG. 3 illustrates one embodiment of a graphical user interface for submitting the input 104 (shown in FIG. 1) to the processor module 102, other embodiments of graphical user interfaces with different layouts and graphical presentations are possible.

The graphical user interface 300 includes a plurality of slider bars 302, 304, 306, 308 that are manipulated by the user to input one or more of the parameters described above. For example, the user may employ an input device such as a mouse at the user interface 106 (shown in FIG. 1) to move one or more of the slider bars 302, 304, 306, 308 to a position that corresponds to one or more input parameters. In the illustrated embodiment, the user can move the slider bar 302 to input the minimum service life parameter described above. For example, the user can move the slider bar 302 to the right in the graphical user interface 300 to indicate that the minimum service life, or breakthrough time, of a filter cartridge that is to be recommended by the processor module 102 is relatively important to the user. Conversely, the user can move the slider bar 302 to the left to indicate that the minimum service life, or breakthrough time, of a filter cartridge that is to be recommended by the processor module 102 is relatively unimportant to the user. The movement of the slider bar 302 is communicated to the processor module 102 as the input 104. The processor module 102 receives the minimum service life parameter input using the slider bar 302 and may limit the list of filter cartridges that are to be recommended to the user as the recommended filter cartridge 240 (shown in FIG. 2) in response thereto. For example, if the user employs the slider bar 302 to indicate that the minimum service life of a filter cartridge is relatively important, then the processor module 102 may limit the possible filter cartridges that may be recommended to those filter cartridges with relatively long service lives. On the other hand, if the user employs the slider bar 302 to indicate that the minimum service life of a filter cartridge is relatively unimportant, then the processor module 102 may not limit the possible filter cartridges that may be recommended based on the service lives of the filter cartridges. Alternatively, instead of indicating the relative importance of a filter cartridges's service life using the slider bar 302, the slider bar 302 may be used to input a minimum service life. For example, the slider bar 302 may be manipulated by the user to input a minimum service life in terms of minutes, hours, or days. Optionally, another input mechanism other than the slider bar 302 is used to input the minimum service life parameter. For example, a window similar to the windows 216 through 222 may be used.

The slider bar 304 can be employed to input the comfort indicator described above. For example, the user can move the slider bar 304 to the right in the graphical user interface 300 to indicate that the comfort indicator of a filter cartridge that is to be recommended by the processor module 102 is relatively important to the user. Conversely, the user can move the slider bar 304 to the left to indicate that the comfort indicator of a filter cartridge that is to be recommended by the processor module 102 is relatively unimportant to the user. In one embodiment, the comfort indicator may be expressed as one or more of the weight and inhalation resistance of a filter cartridge. The movement of the slider bar 304 is communicated to the processor module 102 as the input 104. The professor module 102 receives the comfort indicator input using the slider bar 304 and may limit the list of filter cartridges that are to be recommended to the user as the recommended filter cartridge 240 (shown in FIG. 2) in response thereto. For example, if the user employs the slider bar 304 to indicate that the comfort indicator of a filter cartridge is relatively important, then the processor module 102 may limit the possible filter cartridges that may be recommended to those filter cartridges with relatively low weights and/or low inhalation resistances. On the other hand, if the user employs the slider bar 304 to indicate that the comfort indicator of a filter cartridge is relatively unimportant, then the processor module 102 may not limit the possible filter cartridges that may be recommended based on the weight and/or inhalation resistance of the filter cartridges. Alternatively, instead of indicating the relative importance of a filter cartridge's comfort indicator using the slider bar 304, the slider bar 304 may be used to input a comfort indicator. For example, the slider bar 304 may be manipulated by the user to input a maximum weight and/or inhalation resistance of a filter cartridge. Optionally, another input mechanism other than the slider bar 304 is used to input the comfort indicator. For example, a window similar to the windows 216 through 222 may be used.

The slider bar 306 can be employed to input the cost parameter described above. For example, the user can move the slider bar 306 to the right in the graphical user interface 300 to indicate that the price of a filter cartridge that is to be recommended by the processor module 102 is relatively important to the user. Conversely, the user can move the slider bar 306 to the left to indicate that the price of a filter cartridge that is to be recommended by the processor module 102 is relatively unimportant to the user. The movement of the slider bar 306 is communicated to the processor module 102 as the input 104. The processor module 102 receives the cost parameter input using the slider bar 306 and may limit the list of filter cartridges that are to be recommended to the user as the recommended filter cartridge 240 (shown in FIG. 2) in response thereto. For example, if the user employs the slider bar 306 to indicate that the price of a filter cartridge is relatively important, then the processor module 102 may limit the possible filter cartridges that may be recommended to those filter cartridges with relatively low prices. On the other hand, if the user employs the slider bar 306 to indicate that the price of a filter cartridge is relatively unimportant, then the processor module 102 may not limit the possible filter cartridges that may be recommended based on the price of the filter cartridges. Alternatively, instead of indicating the relative importance of a filter cartridge's price using the slider bar 306, the slider bar 306 may be used to input a price in an amount of currency. For example, the slider bar 306 may be manipulated by the user to input a maximum price of a filter cartridge. Optionally, another input mechanism other than the slider bar 306 is used to input the cost parameter. For example, a window similar to the windows 216 through 222 may be used.

The slider bar 308 can be employed to input the flexibility of use parameter described above. For example, the user can move the slider bar 308 to the right in the graphical user interface 300 to indicate that the flexibility of use of a filter cartridge that is to be recommended by the processor module 102 is relatively important to the user. Conversely, the user can move the slider bar 308 to the left to indicate that the flexibility of use parameter of a filter cartridge that is to be recommended by the processor module 102 is relatively unimportant to the user. The movement of the slider bar 308 is communicated to the processor module 102 as the input 104. The processor module 102 receives the flexibility of use parameter input using the slider bar 308 and may limit the list of filter cartridges that are to be recommended to the user as the recommended filter cartridge 240 (shown in FIG. 2) in response thereto. For example, if the user employs the slider bar 308 to indicate that the flexibility of use parameter of a filter cartridge is relatively important, then the processor module 102 may limit the possible filter cartridges that may be recommended to those filter cartridges with a relatively high flexibilities of use. For example, the processor module 102 may limit the possible filter cartridges to those filter cartridges that may be used with the most different air respirators. On the other hand, if the user employs the slider bar 308 to indicate that the flexibility of use parameter of a filter cartridge is relatively unimportant, then the processor module 102 may not limit the possible filter cartridges that may be recommended based on the flexibility of use of the filter cartridges. Alternatively, instead of indicating the relative importance of a filter cartridge's flexibility of use using the slider bar 308, the slider bar 308 may be used to input a flexibility of use parameter in terms of a minimum number of air respirators with which the recommended filter cartridge 240 (shown in FIG. 2) must be compatible. Optionally, another input mechanism other than the slider bar 308 is used to input the flexibility of use parameter. For example, a window similar to the windows 216 through 222 may be used.

Figure 4:
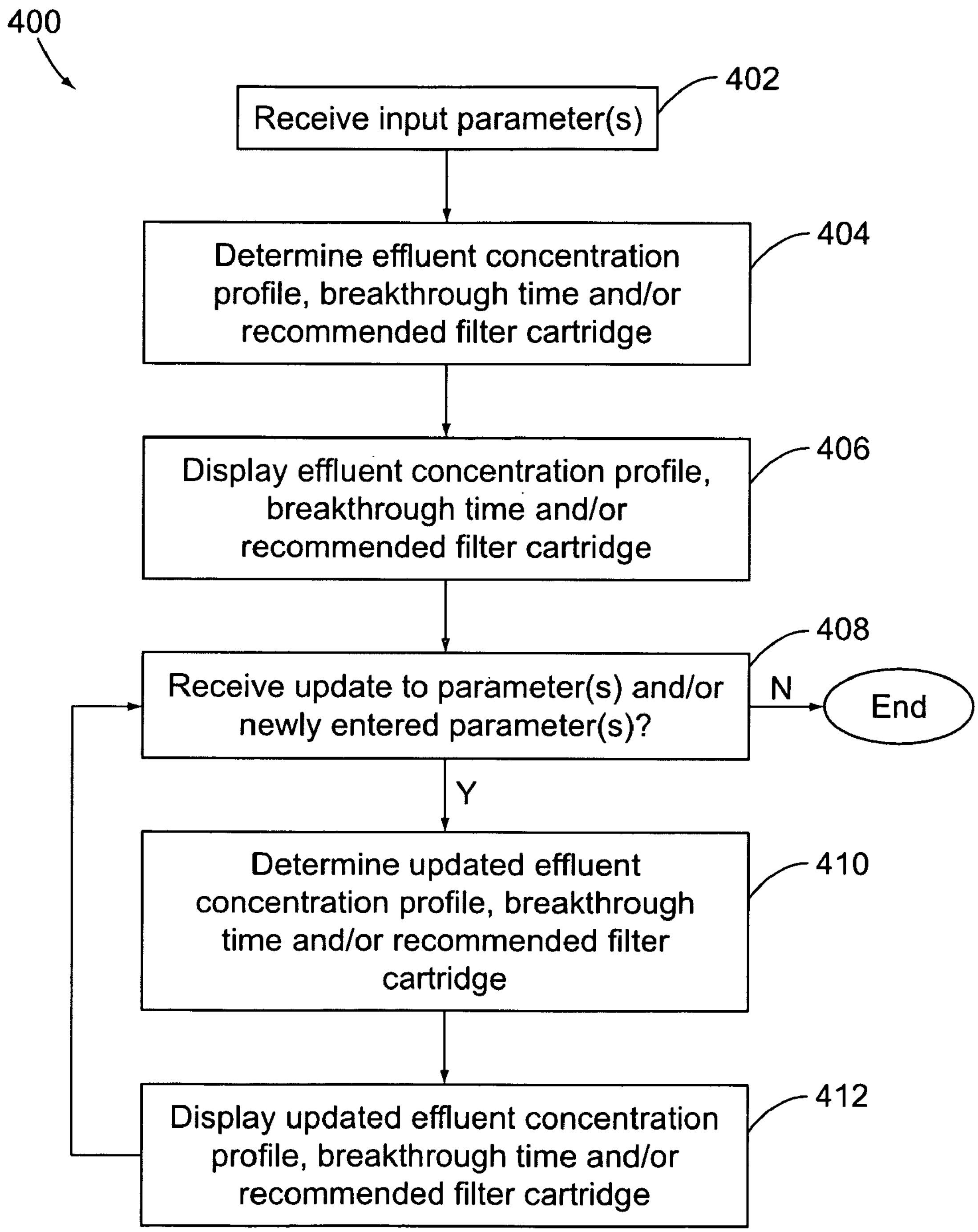
FIG. 4 is a flowchart for a method of determining at least one of an effluent concentration profile, a breakthrough time and a filter cartridge recommendation.

FIG. 4 is a flowchart for a method 400 of determining at least one of an effluent concentration profile, a breakthrough time and a filter cartridge recommendation. At block 402, one or more input parameters are received. For example, one or more use condition parameters, site condition parameters, and cartridge selection parameters are input by a user into the user interface 106 and communicated as input 104 to the processor module 102. At block 404, one or more of the input parameters are employed to determine one or more of the effluent concentration profile, the breakthrough time and the filter cartridge recommendation. For example, the Ding model described above may be used to calculate the effluent concentration profile 204 (shown in FIG. 2) and the breakthrough time 206 (shown in FIG. 2), as described above. At block 406, one or more of the effluent concentration profile, the breakthrough time and the filter cartridge recommendation are displayed to the user. For example, an image of the filter cartridge recommendation 240 (shown in FIG. 2) may be displayed to the user at the output device 108. At block 408, a decision is made as to whether any of the parameters received at block 402 have been updated and/or whether any additional parameters have been received. If one or more parameters have been updated or one or more additional parameters have been received, the method 400 proceeds between block 408 and block 410. If no parameters have been updated or no more parameters have been received, the method 400 terminates. At block 410, an updated effluent concentration profile, breakthrough time and/or filter cartridge recommendation is determined. For example, a change or update to one or more parameters, or the addition of more parameters, may impact the effluent concentration profile, the breakthrough time and/or the filter cartridge recommendation that is determined at block 404. The updated and/or additional parameter(s) are factored in and employed to determine the updated effluent concentration profile, breakthrough time and/or filter cartridge recommendation at block 410. At block 412, the updated effluent concentration profile, breakthrough time and/or filter cartridge recommendation is displayed. For example, an updated plot of the effluent concentration profile and/or breakthrough time may be displayed on the output device 108. The method 400 proceeds between block 412 and block 408.

Figure 5:
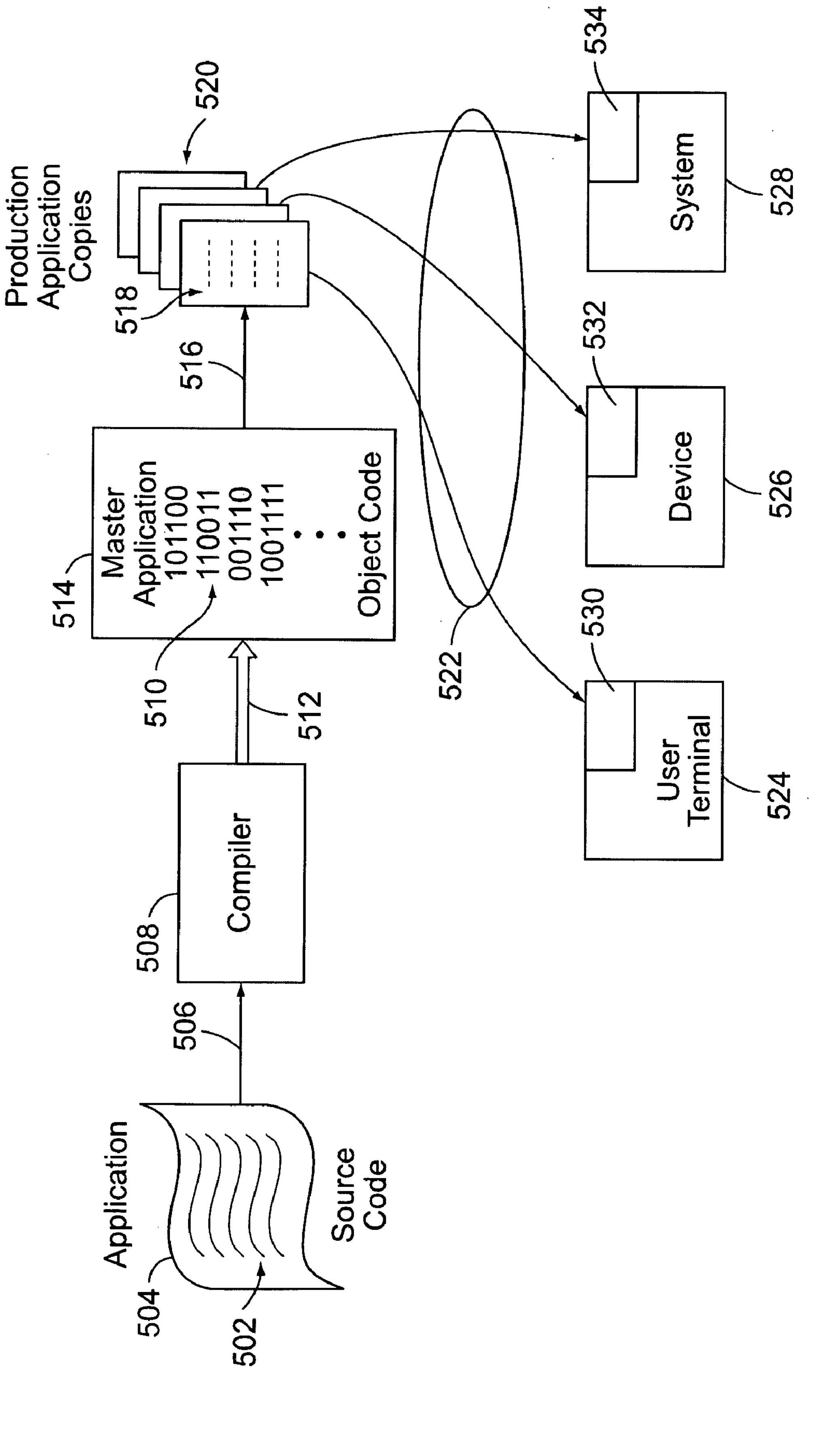
FIG. 5 illustrates a block diagram of exemplary manners in which one or more embodiments described herein may be stored, distributed and installed on computer-readable medium.

FIG. 5 illustrates a block diagram of exemplary manners in which one or more embodiments described herein may be stored, distributed and installed on computer-readable medium. In FIG 5, the "application" represents one or more of the methods and process operations discussed above. For example, the application may represent the process carried out in connection with FIG. 4 as discussed above.

As shown in FIG. 5, the application is initially generated and stored as source code 502 on a source computer-readable medium 504. The source code 502 is then conveyed over path 506 and processed by a compiler 508 to produce object code 510. The object code 510 is conveyed over path 512 and saved as one or more application masters on a master computer-readable medium 514. The object code 510 is then copied numerous times, as denoted by path 516, to produce production application copies 518 that are saved on separate production computer-readable medium 520. The production computer-readable medium 520 is then conveyed, as denoted by path 522, to various systems, devices, terminals and the like. In the example of FIG. 5, a user terminal 524, a device 526 and a system 528 are shown as examples of hardware components, on which the production computer-readable medium 520 are installed as applications (as denoted by 530, 532, 534).

The source code may be written as scripts, or in any high-level or low-level language. Examples of the source, master, and production computer-readable medium 502, 514 and 520 include, but are not limited to, CDROM, RAM, ROM, Flash memory, RAID drives, memory on a computer system and the like. Examples of the paths 506, 512, 516, and 522 include, but are not limited to, network paths, the internet, Bluetooth, GSM, infrared wireless LANs, HIPERLAN, 3G, satellite, and the like. The paths 506, 512, 516, and 522 also may represent public or private carrier services that transport one or more physical copies of the source, master, or production computer-readable medium 502, 514 or 520 between two geographic locations. The paths 506, 512, 516, and 522 may represent threads carried out by one or more processors in parallel. For example, one computer may hold the source code 502, compiler 508 and object code 510. Multiple computers may operate in parallel to produce the production application copies 518. The paths 506, 512, 516, and 522 may be intra-state, inter-state, intra-country, inter-country, intra-continental, inter-continental and the like.

The operations noted in FIG. 5 may be performed in a widely distributed manner world-wide with only a portion thereof being performed in the United States. For example, the application source code 502 may be written in the United States and saved on a source computer-readable medium 504 in the United States, but transported to another country (corresponding to path 506) before compiling, copying and installation. Alternatively, the application source code 502 may be written in or outside of the United States, compiled at a compiler 508 located in the United States and saved on a master computer-readable medium 514 in the United States, but the object code 510 transported to another country (corresponding to path 516) before copying and installation. Alternatively, the application source code 502 and object code 510 may be produced in or outside of the United States, but production application copies 518 produced in or conveyed to the United States (for example, as part of a staging operation) before the production application copies 518 are installed on user terminals 524, devices 526, and/or systems 528 located in or outside the United States as applications 530, 532, 534.

As used throughout the specification and claims, the phrases "computer-readable medium" and "instructions configured to" shall refer to any one or all of i) the source computer-readable medium 504 and source code 502, ii) the master computer-readable medium and object code 510, iii) the production computer-readable medium 520 and production application copies 518 and/or iv) the applications 530, 532, 534 saved in memory in the terminal 524, device 526 and system 528.

It is to be understood that the above description is intended to be illustrative, and not restrictive. For example, the above described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:

receiving at least one input parameter;

determining an effluent concentration profile based on the at least one input parameter and at least one mathematical model applied to the at least one input parameter; and graphically displaying the effluent concentration profile that includes a plot of a concentration of a chemical species over a period of time through a filter bed of a filter cartridge.

2. The method of claim 1, wherein receiving the at least one input parameter comprises receiving one or more of an ambient pressure, an ambient temperature, a relative humidity, a breathing rate, a chemical contaminant, a chemical concentration, an occupational exposure limit, a user-selected cartridge, or a cartridge selection parameter as the at least one input parameter.

3. The method of claim 2, wherein the cartridge selection parameter comprises at least one of a designated service life, a comfort indicator, a price, an empirical result from at least one prior determination of a filter cartridge recommendation based on at least one common input parameter, a current inventory of a filter cartridge, a regional filter cartridge requirement, an indication of phasing out a filter cartridge, or an indication of phasing in a filter cartridge.

4. The method of claim 3, wherein the comfort indicator includes at least one of a filter weight or an inhalation resistance.

5. The method of claim 1, wherein determining the effluent concentration profile comprises determining the effluent concentration profile when a designated amount of the at least one input parameter is received.

6. The method of claim 1, wherein determining the effluent concentration profile comprises obtaining one or more additional input parameters, the additional input parameters comprising at least one parameter not received at the receiving step but necessary to determine the effluent concentration profile.

7. The method of claim 1, further comprising:

receiving at least one of an update to the input parameter or a newly input parameter;

updating the effluent concentration profile to determine an updated effluent concentration profile based on the at least one of the update to the input parameter or the newly input parameter; and displaying the updated effluent concentration profile.

8. The method of claim 1, wherein determining the effluent concentration profile comprises calculating a position of a breakthrough wave front of the chemical species through the filter bed, the position being a function of at least one of an evolution speed at which the breakthrough wave front evolves from the filter bed or time raised to a power of an acceleration factor, the acceleration factor being less than one for breakthrough wave fronts having a decelerating evolution speed and being greater than one for breakthrough wave fronts having an accelerated evolution speed.

9. The method of claim 1, wherein determining the effluent concentration profile comprises calculating a position of the chemical species through the filter bed according to $\zeta=\tau^{\zeta}$, where $\zeta$ is the position, t is a time within the period of time, and $\zeta$ is an acceleration factor, the acceleration factor being less than one for breakthrough wave fronts having a decelerating evolution speed and being greater than one for breakthrough wave fronts having an accelerated evolution speed.

10. The method of claim 1, wherein receiving comprises receiving at least one input parameter from a sensor.

11. The method of claim 1, wherein at least one of the at least one input parameter is not a measured concentration.

12. A method comprising:

receiving at least one input parameter;

determining an effluent concentration profile based on the at least one input parameter; and graphically displaying the effluent concentration profile that includes a plot of a concentration of a chemical species over a period of time through a filter bed of a filter cartridge, wherein receiving the at least one input parameter comprises:

receiving at least one of a respirator type or a particulate protection level; and determining a user-selected cartridge based on at least one of the respirator type or the particulate protection level.

13. A computer-readable storage medium comprising one or more sets of instructions for determining at least one of an effluent concentration profile, a breakthrough time or a filter cartridge recommendation, the sets of instructions comprising:

instructions for receiving at least one input parameter, wherein at least one of the at least one input parameter is not a measured concentration;

instructions for determining at least one of the effluent concentration profile, the breakthrough time or the filter cartridge recommendation based on the at least one input parameter; and instructions for graphically displaying at least one of the effluent concentration profile, the breakthrough time, or the filter cartridge recommendation, the effluent concentration profile comprising a plot of a concentration of a chemical species over a period of time, the breakthrough time comprising a time at which a predetermined concentration of the chemical species passes through a filter cartridge.

14. The computer-readable storage medium of claim 13, wherein the instructions for receiving comprise instructions for receiving one or more of an ambient pressure, an ambient temperature, a relative humidity, a breathing rate, a chemical contaminant, a chemical concentration, an occupational exposure limit, a user-selected cartridge, or a cartridge selection parameter.

15. The computer-readable storage medium of claim 14, wherein the instructions for receiving comprise instructions for receiving at least one of a respirator type or a particulate protection level, further comprising instructions for determining the user-selected cartridge based on at least one of the respirator type or the particulate protection level.

16. The computer-readable storage medium of claim 13, wherein the instructions for determining comprise instructions for determining at least one of the effluent concentration profile, the breakthrough time or the filter cartridge recommendation only when a minimum level of input parameters are received at the receiving step.

17. The computer-readable storage medium of claim 13, further comprising instructions for updating at least one of the effluent concentration profile, the breakthrough time or the filter cartridge recommendation and the displaying step and for displaying at least one of an updated effluent concentration profile, an updated breakthrough time or an updated filter cartridge recommendation based on at least one of the input parameters.

18. The computer-readable storage medium of claim 13, wherein the instructions for determining comprise instructions for calculating a position of a breakthrough wave front of a chemical contaminant through a filter bed, the position being a function of at least one of an evolution speed at which the breakthrough wave front evolves from the filter bed or time raised to a power of an acceleration factor, the acceleration factor being less than one for breakthrough wave fronts having a decelerating evolution speed and being greater than one for breakthrough wave fronts having an accelerated evolution speed.

19. The computer-readable storage medium of claim 13, wherein the instructions for receiving comprises instructions for receiving at least one input parameter from a sensor.

20. The computer-readable storage medium of claim 13, wherein the instructions for determining comprise instructions for calculating a position of the chemical species through the filter bed according to $\zeta=\tau^{\zeta}$, where $\zeta$ is the position, t is a time within the period of time, and $\zeta$ is an acceleration factor, the acceleration factor being less than one for breakthrough wave fronts having a decelerating evolution speed and being greater than one for breakthrough wave fronts having an accelerated evolution speed.

21. The computer-readable storage medium of claim 13, wherein the instructions for determining comprise instructions for determining the effluent concentration profile based on the input parameter and at least one mathematical model applied to the input parameter.

22. A computer-readable storage medium comprising one or more sets of instructions for determining at least one of an effluent concentration profile, a breakthrough time or a filter cartridge recommendation, the sets of instructions comprising:

instructions for receiving at least one input parameter including a cartridge selection parameter, wherein the cartridge selection parameter comprises at least one of a service life, a comfort indicator, a price, an empirical result from at least one prior determination of the filter cartridge recommendation based on at least one common input parameter, a current inventory of a filter cartridge, a regional filter cartridge requirement, an indication of phasing out a cartridge, or an indication of phasing in a cartridge;

instructions for determining at least one of the effluent concentration profile, the breakthrough time or the filter cartridge recommendation based on the at least one input parameter; and instructions for graphically displaying at least one of the effluent concentration profile, the breakthrough time, or the filter cartridge recommendation, the effluent concentration profile comprising a plot of a concentration of a chemical species over a period of time, the breakthrough time comprising a time at which a predetermined concentration of the chemical species passes through a filter cartridge.

23. A system comprising:

a user interface configured to input at least one input parameter;

a processor module communicatively coupled to the user interface and receiving the input parameter, the processor module determining an effluent concentration profile based on the input parameter and at least one mathematical model applied to the input parameter; and an output device communicatively coupled to the processor module, the output device graphically displaying the effluent concentration profile as a plot of a concentration of a chemical species in a filter bed of a filter cartridge over a period of time.

24. The system of claim 23, wherein the input parameter comprises one or more of an ambient pressure, an ambient temperature, a relative humidity, a breathing rate, a chemical contaminant, a chemical concentration, an occupational exposure limit, a user-selected cartridge, a minimum service life, a comfort indicator, a price, an empirical result from at least one prior determination of a filter cartridge recommendation based on at least one common input parameter, a current inventory of a filter cartridge, a regional filter cartridge requirement, an indication of phasing out a filter cartridge, or an indication of phasing in a filter cartridge.

25. The system of claim 23, wherein the processor module is configured to receive at least one of an update to the input parameter or a newly input parameter and update the effluent concentration profile based on the at least one of the update or the newly input parameter to determine an updated effluent concentration profile.

26. The system of claim 23, wherein the processor module determines the effluent concentration profile by calculating a position of a breakthrough wave front of the chemical species through the filter bed, the position being a function of at least one of an evolution speed at which the breakthrough wave front evolves from the filter bed or time raised to a power of an acceleration factor, the acceleration factor being less than one for breakthrough wave fronts having a decelerating evolution speed and being greater than one for breakthrough wave fronts having an accelerated evolution speed.

27. The system of claim 23, further comprising a sensor communicatively coupled to the processor module, the sensor configured to communicate the at least one input parameter to the processor module.

* * * * *